United States Patent [19]

Hasegawa et al.

[11] Patent Number: 5,659,736

[45] Date of Patent: Aug. 19, 1997

[54] MANAGEMENT INFORMATION BASE AND METHOD IN AN OSI MANAGEMENT SYSTEM

[75] Inventors: Ayumi Hasegawa; Hiromitsu Kawamura, both of Kanagawa, Japan

[73] Assignee: Mitsubishi Denki Kabushiki Kaisha, Tokyo, Japan

[21] Appl. No.: 601,467

[22] Filed: Feb. 14, 1996

Related U.S. Application Data

[63] Continuation of Ser. No. 343,140, Nov. 22, 1994, abandoned.

[30] Foreign Application Priority Data

Nov. 29, 1993 [JP] Japan .................... 5-298416

[51] Int. Cl.⁶ .................................... G06F 17/30
[52] U.S. Cl. .................. 395/611; 395/614; 395/683
[58] Field of Search ........................ 395/600, 622, 395/611, 614, 683

[56] References Cited

U.S. PATENT DOCUMENTS

| | | | |
|---|---|---|---|
| 5,012,405 | 4/1991 | Nishikado et al. | 395/600 |
| 5,129,084 | 7/1992 | Kelly et al. | 395/650 |
| 5,187,786 | 2/1993 | Densmore et al. | 395/600 |
| 5,201,046 | 4/1993 | Goldberg et al. | 395/600 |
| 5,317,742 | 5/1994 | Kelly, Jr. et al. | 395/650 |
| 5,359,724 | 10/1994 | Earle | 395/600 |
| 5,367,635 | 11/1994 | Bauer et al. | 395/200 |
| 5,369,778 | 11/1994 | San Soucie et al. | 395/600 |
| 5,379,422 | 1/1995 | Antoshenkov | 395/600 |
| 5,414,812 | 5/1995 | Filip et al. | 395/200 |

OTHER PUBLICATIONS

El-Sharkawi et al., "Object migration mechanisms to support updates in object–oriented database." IEEE, 1990, pp. 378–387.

Ketabchi et al.;"Comparative analyis of RDBMS and OODBMS a case study."; IEEE; 1990; pp. 528–537.

Nakai et al. "A development enviroment for OSI system management" INM.II, pp. 157–168 Jan. 1991.

Gilbert w.Maymon, "An information model for configuration management of swithching network elements, using OSI tools", IEEE 1991, pp. 0118–0122 Mar. 1991.

Nakai, S. et al "A development enviroment for OSI system management" ISBN 0444890209, pp. 157–168 Jan. 1991.

Sinha, Alok, "An introduction to network programing using the Netbois interface", Microsoft systems journal, V7, n2, p. 61 (21) Mar. 1992.

Giles, Roosevelt, "Technology information", Network Var, V3, n10, p40(7) Oct. 1995.

*Primary Examiner*—Thomas G. Black
*Assistant Examiner*—Jean M. Corrielus
*Attorney, Agent, or Firm*—Wolf, Greenfield & Sacks, P.C.

[57] ABSTRACT

Contained relationship between instances of a Management Information Base under OSI management, such as parent-child or brother-brother relationships are retained in containment relationship files, which are prepared for each depth level of a containment tree. Management information of the instances are stored in instance files, which are separated for each managed object class. A file storing the containment relationship points to the management information in the instance file with a pointer. The instance file stores the maximum number of attributes and the maximum attribute size and the update time for the management information of each instance.

25 Claims, 29 Drawing Sheets

FIG. 5

EXAMPLE OF MANAGEMENT INFORMATION

No. OF ATTRIBUTES=6
| AMOUNT OF SENDING DATA (S-AMT) |
| AMOUNT OF RECEIVING DATA (R-AMT) |
| No. OF SENDING DATA (S-NO) |
| No. OF RECEIVING DATA (R-NO) |
| No. OF SENDING ERRORS (S-ER) |
| No. OF RECEIVING ERRORS (R-ER) |

ATTRIBUTE SIZE = 8 BYTES

FIG. 6

FILE NAMES OF CONTAINMENT RELATIONSHIP FILES

/DB / SUBTREE / 1    FILE NAME OF DEPTH LEVEL 1

/DB / SUBTREE / 2    FILE NAME OF DEPTH LEVEL 2

/DB / SUBTREE / 3    FILE NAME OF DEPTH LEVEL 3

/DB / SUBTREE / 4    FILE NAME OF DEPTH LEVEL 4

DEPTH LEVEL OF CONTAINMENT TREE

FILE NAMES OF INSTANCE FILES

| OBJECT IDENTIFIER FOR MANAGED OBJECT CLASS "SYSTEM" = "2.9.3.2.3.13" |
| OBJECT IDENTIFIER FOR MANAGED OBJECT CLASS "NETWORK" = "1.3.14.2.2.1.5" |

/DB / 2/9/3/2/3/13i    FILE NAME OF INSTANCE FILE FOR MAMAGED OBJECT CLASS "SYSTEM"

/DB /1/3/14/2/2/1/5i    FILE NAME OF INSTANCE FILE FOR MAMAGED OBJECT CLASS "NETWORK"

BEFORE SORT

AFTER SORT

BEFORE SORT

AFTER SORT

A CONFIGURATION OF
NETWORK MANAGEMENT APPARATUS

FILE NAME
subtree_file :/usr/OM/db/n/ (n=1,2,.. DEPTH LEVEL OF CONTAINMENT TREE)
instance_file :/usr/OM/db/x/ (x=CHARACTER SEQUENCE OF OBJECT IDENTIFIER OF MANAGED OBJECT CLASS REPLACING SEPARATORS WITH '/')

CONVENTIONAL OSI MANAGEMENT SYSTEM

EXAMPLE OF INHERITANCE TREE

MANAGED OBJECT INSTANCE

OBJECT IDENTIFIER
OF MANAGED OBJECT CLASS
NAME ATTRIBUTE TYPE = "VALUE"

EXAMPLE OF CONTAINMENT TREE

FIG. 31
RELATED ART

LOGICAL STRUCTURE

```
331 NODE: top
  CHARACTERISTIC a
  CHARACTERISTIC b
  {mObject Class 1}

├── 333: Class Y
  │     CHARACTERISTIC Y1
  │     CHARACTERISTIC Y2
  │     {mObject Class 3}
  │
  ├── 334: Class Z
  │     CHARACTERISTIC Z1
  │     CHARACTERISTIC Z2
  │     {mObject Class 2}
  │
  └── 332 NODE: Class X
        CHARACTERISTIC X1
        CHARACTERISTIC X2
        {mObject Class 4}
         │
         └── 335: Class Xx
               CHARACTERISTIC Xx1
               CHARACTERISTIC Xx2
               {mObject Class 5}
```

PHYSICAL STRUCTURE

MANAGEMENT INFORMATION BASE AND METHOD IN AN OSI MANAGEMENT SYSTEM

This application is a continuation of application Ser. No. 08/343,140, filed Nov. 22, 1994 and now abandoned.

BACKGROUND OF THE INVENTION

1. Field of the Invention

This invention relates to the internal structure of a database for an open systems interconnection (hereinafter referred to as the OSI) management system. Specifically, this invention relates to the structure of a management information base (MIB) and its maintenance.

2. Description of the Related Art

The basic concept of network management was not yet established at the initial stage of an OSI reference model for a computer networking. There was no mechanism for controlling a total network for the OSI reference model. The increase in the number of nodes connected to a network has inevitably expanded the scope of communication networking, necessitating a network manager to grasp the status of all managed objects on the network accurately and in real time. The OSI management system is designed out of this necessity to optimize resource management of a network. In response to multiple requests and needs, the OSI divides network management functions into the following five;

1. Fault management

The fault management function keeps a record of error occurrences, receives error detection notifications and takes corrective measures, and diagnoses symptoms.

2. Accounting management

The accounting management function accounts or computes costs according to the usage of the network resources.

3. Configuration and name management

This function collects data, and identifies and administers the network resources for uninterrupted network services, which include;

setting system parameters, activating and deactivating network resources, collecting data that affects network status, updating network configuration.

4. Performance management

This function is vital for evaluating the operating status of network resources and communication efficiency, and includes the following:

collecting statistical data for analyses and plans, keeping the system use records, measuring and monitoring the amount of data transmission so as to prevent network overload, and diagnosing network operation to check for incorrect data.

5. Security management

The security management is responsible for preservation of network resources through authorization, access management, encipherment, and maintenance of security records.

The standardization of the OSI network management is still in the making. For instance, how managed information is typically stored in an MIB is not yet agreed upon, thus leaving the definition to each system.

FIG. 27 gives a general idea of a conventional OSI management system, which is made up of two major networks: i.g., a management network 100 and a managed object network 200. The management network 100 is responsible for the resources contained in the managed object network 200. The resources in the managed object network are referred to as the managed objects. They are further grouped into two systems. System 210 has a local area network (LAN) 211 and a workstation 212. System 220 has a private branch exchanger (PBX) 221, a personal computer 222, a time division multiplexer (TDM) 223, and a workstation 224. All these objects are systematized to build a network responsive to user needs. The managed object network 200 provides a system for implementing user jobs.

The management network 100 is configured by multiple agents 102a–102c, a manager 101, a management information base (MIB) 110, and a network 103. The agents 102a, 102b, and 102c directly monitor and manage the managed objects in the managed object network 200. The agents send and receive information necessary for the network management to and from the managed objects. The information received from the managed objects is then forwarded to the manager 101, which oversees the agents. The OSI management is carried out in accordance with the management protocol, and the information transmitted through the manager, agents, and the managed objects are stored in the MIB 110 as the management information. The method of storing information in the MIB is unique to individual systems, as the OSI standard has not been established yet.

The structure of management information is laid out in FIGS. 28(a), 28(b) and 29(c). The most important factor that comes into play in structuring the network management information is its extensibility. The managed information can never be a fixed because managed objects are constantly altered, added, deleted, or updated in real time. One typical method that has been developed is an object oriented type of design. The main feature of the object oriented type of design is that it has introduced the concept of a class and an instance. The class defines characteristics common in certain objects and the instance stands for concrete items having those characteristics defined by the class. FIGS. 28(a), 28(b) and 28(c) give some ideas about the class and the instance. The items in ovals represent the class whereas those in rectangles indicate instances. In of FIG. 28(a), the class computer has the instances such as a personal computer, a workstation, and a small business computer. In FIG. 28(b), for the class personal computer, there are such instances as an 8-bit machine, a 16-bit machine, and a 32-bit machine. In FIG. 28(c), the class animal contains such instances as a dog, a cat, and a horse. Classes for the OSI management are referred to as the managed object class and the instances are to the managed object instance, or simply the instance.

FIG. 29 illustrates an example of managed object classes in a form of an inheritance tree. Each oval indicates a managed object class and all classes are the subclasses of the top class. Characteristics of the superclasses are inherited by the subclass; the subclass definition may add to these characteristics but may not remove any characteristics of the superclass. The characteristics here include attributes, action, notification, and behavior. In FIG. 29, for example, a subclass network inherits all the characteristics of a superclass system. A subsystem workstation also inherits all the characteristics of the system.

FIGS. 30(a) and 30(b) illustrate an example of a containment tree of managed object instances. Managed object instances are uniquely named on the basis of the containment tree, which represents the containment relationship of the managed object instances. FIG. 30(a) shows how a managed object instance is expressed. The managed object instance is expressed by an object identifier of the managed object class and a distinguished name given to a managed object instance. Expressions shown in FIG. 30(a) are applied to a containment tree in FIG. 30(b). The vertical linkage or a hierarchy of the containment tree indicates a parent-child relationship: the horizontal linkage brother-brother relationship. The managed object network 200 in FIG. 27 finds its expression in this containment tree, in that the system 210 and the system 220 come as the subinstances to the root, and below the system 210 come the LAN 211 and the workstation 212.

All managed object instances have a name attribute type. The name attribute type and a value of the type of the attribute are grouped into a set and forms a relative distinguished name or RDN. The RDNs of the workstation 212 and the workstation 224 are identical, namely, (WSID="W1"). On the other hand, RDNs listed in the hierarchical order is called a distinguished name or DN. For instance, the DN for workstation 212 is {systemID="XYZ"}{WSID="W1"} as opposed to {systemID="OPQ"}{WSID="W1"} for workstation 224. In this way, the workstation 212 and workstation 224 may be uniquely identified with their DNs despite that their RDNs are the same.

FIG. 31 illustrates the logical structure and FIG. 32 shows the physical structure of an inheritance tree designated in the Japan unexamined patent publication 3-231352. FIG. 32 shows the physical structure under which the inheritance tree is actually stored in the MIB. The managed object classes in FIG. 32 are represented as nodes, each of which is provided with a left and a right pointers. The left pointer points a parent-child relationship and the right pointer is used to indicate brother-brother relationship. These two pointers on left and right remarkably expedite the search of an inheritance tree.

FIG. 33 shows the MIB data structure reported at the 42th Information Processing Society of Japan (1-169 to 1-170) in spring 1991. The attribute information of an instance is accessed through an instance information table 400. The instance information table not only retains addresses for instances immediately on its upper, lower, left and right sides, but also stores the forward address with which to carry out forward pointer search. The upper, lower, left, and right addresses are used to search the containment tree. The forward address is used to identify lower instance groups contained in a certain instance. Employing these two methods of binary tree search and forward pointer search permits an efficient search of instances. The instance information table is referenced from an agent information table 410. The agent information table and instance information table are stored by each agent. Addresses in the class information table 500 are sorted into upper and lower addresses to facilitate class information search. An attribute information table 520 stores class attributes, which can be referenced with the attribute list information in the class information table.

Problems to be solved by this Invention

The sheer enormity of the amount of data to be stored in an MIB renders the system configuration a critical factor in network management. The easy-to-operate system configuration that enables high-speed access to instances and dynamic updating of management information is imperative. For a conventional OSI management system, because the relationships and the structure of the managed objects are incorporated statically at the installation of system application or at the compilation of the application programs, the containment relationship among the managed objects or the structure of the management information base have to be built into by the application, thereby hindering a flexible system configuration.

When characteristics of a superclass had to be changed, for instance, the subclass also has to be redefined based on the new definition of the superclass, and the related programs have to be recompiled and relinked. The conventional MIBs shown in FIGS. 31, 32, and 33 are designed to solve such problems and to realize a high-speed access to instances and dynamic updating required each time the network configuration was modified. These systems still have some aspects that need improvement in light of comprehensive and flexible system configuration for both managed object classes and managed object instances.

As has been previously noted, the standardization of the network management is still in the making and the method of storing management information in an MIB varies from one system to another.

Accordingly, it is a primary object of the present invention to propose a new MIB file configuration and to provide an OSI management system based on the file configuration. Moreover, this invention aims at providing effective means for configuration and name management of the management mechanisms previously mentioned. These objectives are:

(1) To flexibly add or delete an instance to update the containment relationships of the instances in the database of the network manager with utilizing the object-oriented concept, (2) To maintain the MIB with ease, (3) To not waste resources each time an instance stored in the MIB is added or deleted.

Another objective of the present invention is to provide a system that allows more efficient maintenance and operation of a network management. The managed objects, which used to be statically incorporated in the MIB at its creation based on the OSI reference model, are to be dynamically updated.

SUMMARY OF THE INVENTION

According to one aspect of this invention, a management information base, under an OSI management system, for storing objects to be managed, in a containment relationship, may include, (a) a plurality of containment relationship files for storing the containment relationship between the objects to be managed, (b) a plurality of instance files for storing management information about the objects to be managed, and (c) a database access unit for accessing the management information in the instance files according to the containment relationship in the containment relationship files.

The containment relationship is a containment tree having a plurality of depth levels including a top level and a bottom level and wherein a relationship file is created at each depth level of the containment tree.

Each of the containment relationship files includes blocked areas for storing a plurality of brother managed objects based on the level of the containment tree.

Each of blocked areas includes a pointer for pointing to another blocked area when a brother is stored in another blocked area.

A managed object class is assigned to each of managed objects and an instance file is created corresponding to each of the managed object classes so that the management information of the managed object class is stored in the instance file assigned to the managed object.

According to another aspect of this invention, a method for managing a management information base wherein the management information base is a set of managed objects in a containment relationship indicated by a containment tree and each of the managed objects belongs to a managed object class, may comprise the steps of, (a) creating a containment relationship file at each depth level of the containment tree, for storing the containment relationship, (b) providing a parent-child relationship and a brother-brother relationship between containment relationship files in each of containment relationship files, (c) creating at least one instance file at each managed object class for storing management information of managed objects, and (d) storing managed objects in the instance files and linking the managed objects with the containment relationship files.

BRIEF DESCRIPTION OF THE DRAWINGS

FIG. 5 shows an example of management information according to the present invention.

FIG. 6 shows examples of file names of containment relationship files according to the present invention.

FIG. 31 shows a logical structure of a conventional inheritance tree.

DESCRIPTION OF THE PREFERRED EMBODIMENT

Embodiment 1

Figure 1:
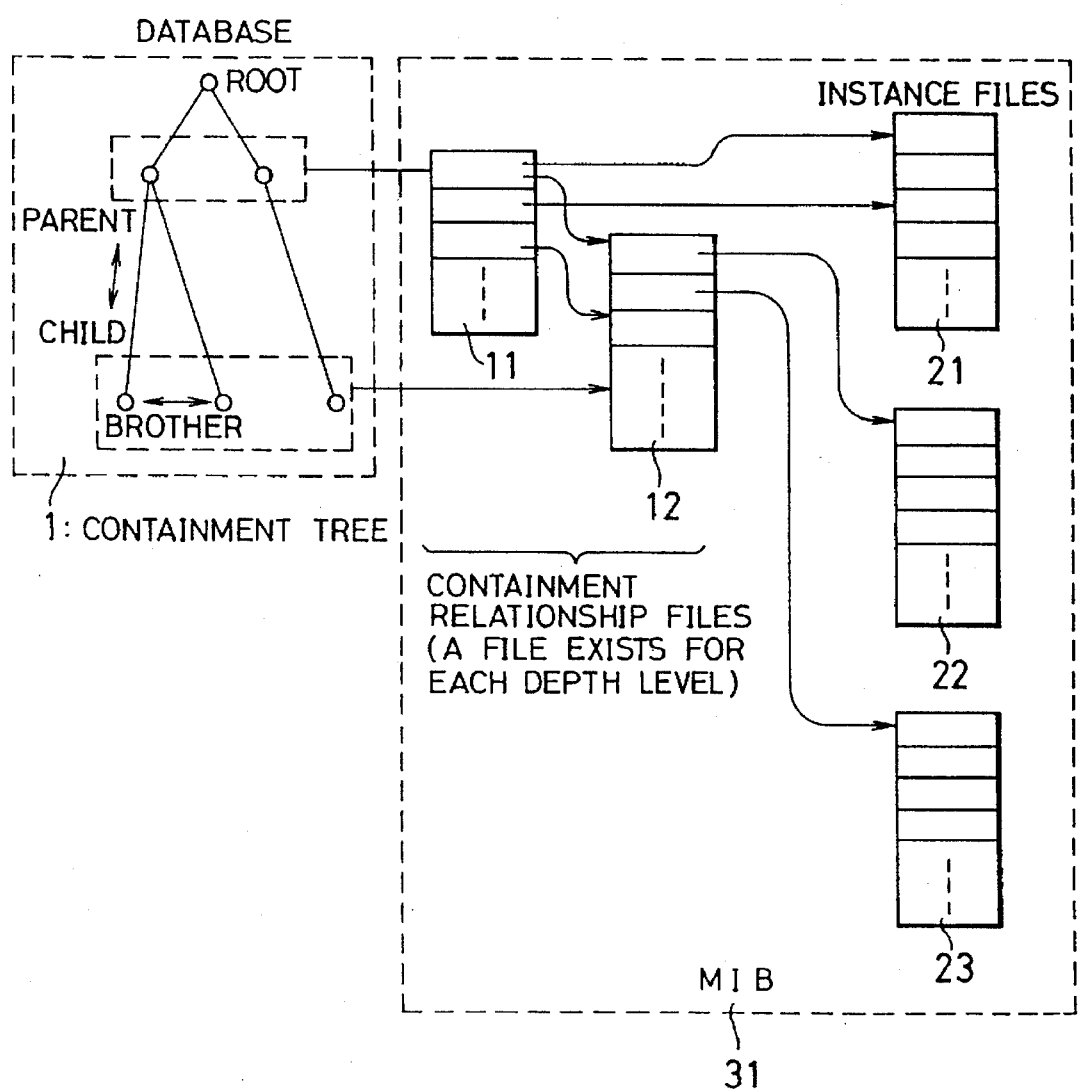
FIG. 1 is a general description of a database according to the present invention.

Examples of this invention are explained using figures. FIG. 1 is a general description of a database. A containment tree 1 consists of instances that are positioned on the basis of their hierarchical order or depth level. A MIB 31 stores containment relationship files 11 and 12, and instance files 21, 22, and 23. The containment relationship files are prepared for each depth level of a containment tree and instance files are created for each managed object class.

Figure 2:
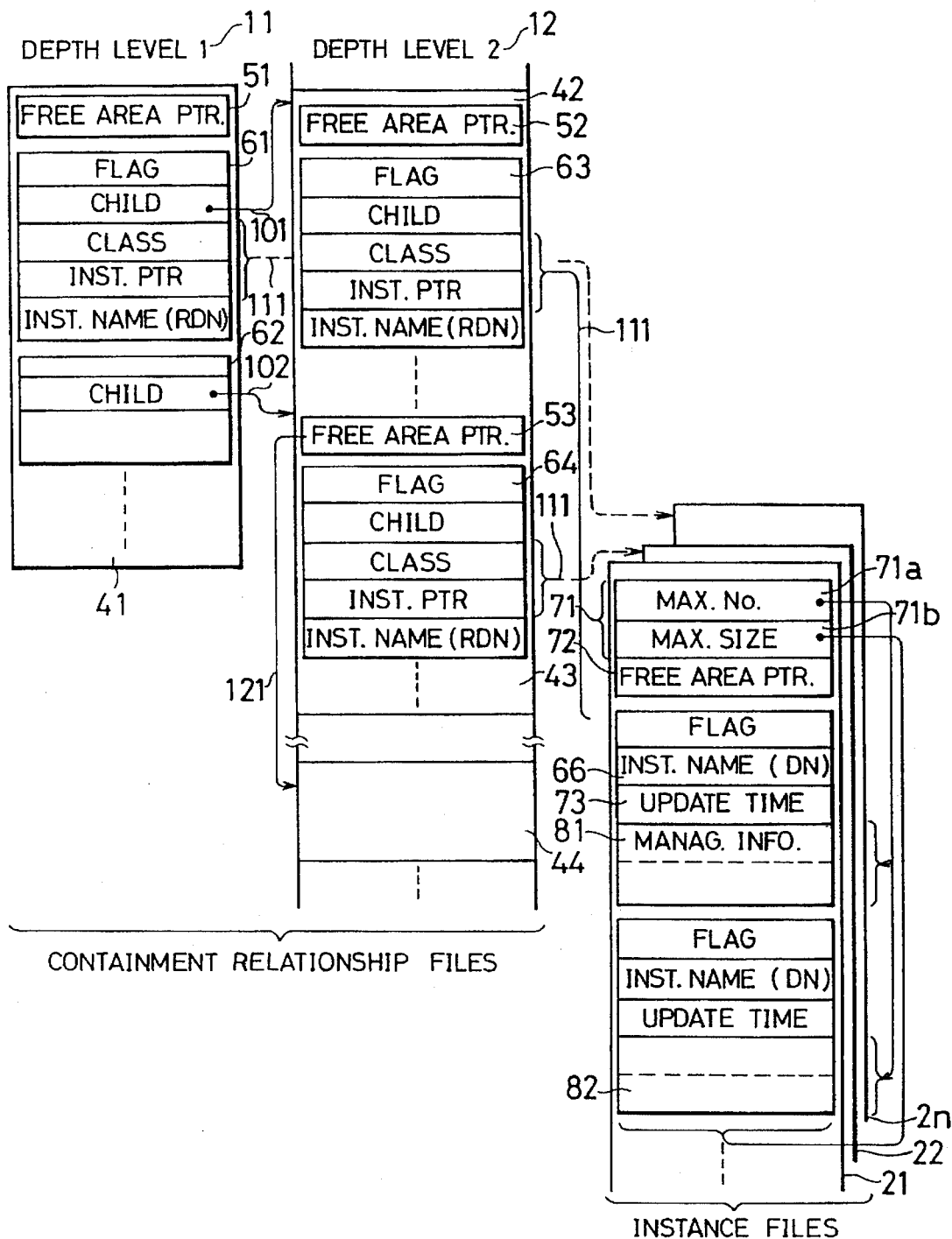
FIG. 2 gives the details of the structure of a containment relationship file and an instance file according to the present invention.

Details of the containment relationship files and an instance file are given in FIG. 2.

In the containment relationship files, data regarding brothers is stored in brother recording areas 41 through 44. Pointers for managing free brother recording areas is stored as free area pointers 51, 52, and 53. Data 61 through 64 are used to hold a relation of instances in a containment tree and can be a flag, a pointer to a child, class, or instance and instance name. As an instance name, a relative distinguished name is stored for the containment relationship file while a distinguished name is stored for an instance file.

Instance files contain an area 71, which stores the size of the maximum number of attributes 71a and the maximum attribute size 71b that an instance can obtain in the instance file. By multiplying the maximum number of attributes and the maximum attribute size, the management information size can be obtained. The management information size is described in the following section. The management information for each instance is stored in management information areas 81 and 82. Pointers 101 and 102 point to their own children. A pointer 111 points to a relevant instance in the instance file using the class and the instance pointer. A pointer 121 is used to point a new brother recording area when a brother recording area becomes full and can not store any more brother instances.

The size of management information areas 81 and 82 can be calculated by the maximum number of attributes 71a and the maximum attribute size 71b. Assuming that the maximum number of attributes is 2 and the maximum attribute size is 8 bytes, then the size of the management information areas 81 and 82 will become 16 bytes as follows;
The maximum number of attributes 2×maximum attribute size 8=16 bytes.

Figure 3:
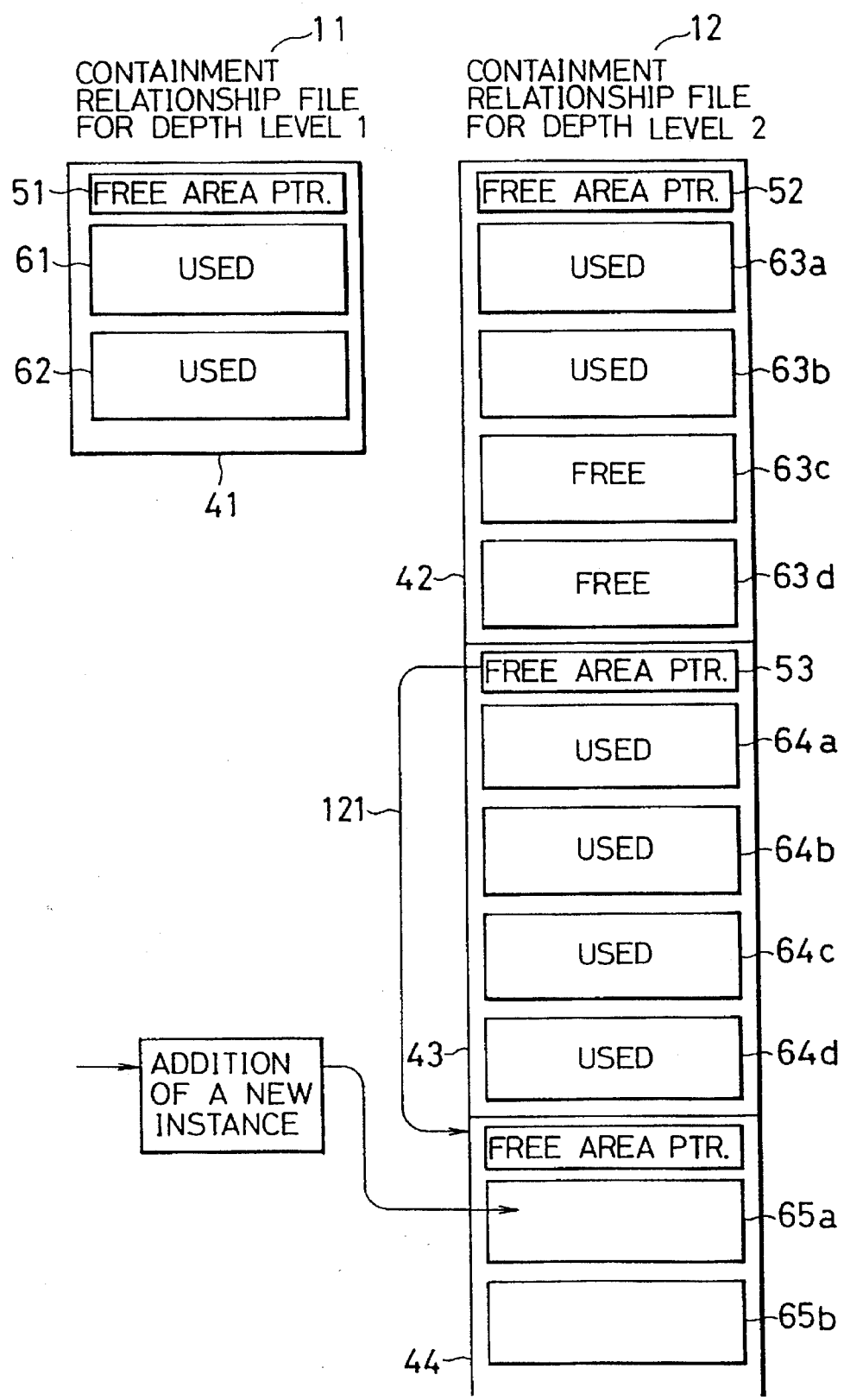
FIG. 3 gives examples of containment relationship files according to the present invention.

The structure of a containment relationship file depends on the structure of a containment tree; its depth and the number of brothers each depth level contains. For example, as is shown in FIG. 3, while up to two brothers can be saved in the brother recording area 41 of the containment relationship file 11 for depth level 1, the containment relationship file 12 for depth level 2 can save maximum four brothers in the brother recording areas 42, 43, and 44. Not only can a containment relationship file be prepared for each depth level but also the number of brothers to be stored in the brother recording area can be changed according to the containment relationship of the managed objects. In FIG. 3, an area to save two data blocks 61 and 62 is defined in advance in the brother recording area 41 of the containment relationship file 11 for depth level 1 because depth level 1 has only two brothers. In the same manner, the containment relationship file 12 for depth level 2 is created to save four brothers in the brother recording areas 42, 43, and 44. If depth level 2 of a containment tree has four brothers, then the containment relationship file can secure an area in which to save four data blocks based on the containment tree.

It is important to note that, however, the number of brother recording areas need not equal the number of the brothers. Even if depth level 2 has five brothers, for example, the number of brother recording areas can be four. This is because when data overflows, the overflown data could be moved to another brother recording area. See the brother recording area 42 in FIG. 3. The third data can be stored in free area 63c. However, to store new data in brother recording area 43, because the brother recording area 43 (64a, 64b, 64c, and 64d) has already been occupied, the new data or the fifth data must be moved to another area, for instance, to brother recording area 44. This could be indicated by a free area pointer 121. The new area 44 is pointed by the free area pointer of the brother recording area, indicating that the overflowed data is stored in it. The new data is thus stored in the free area 65a. Therefore the number of items to be stored in the brother recording area does not necessarily match the maximum number of brothers.

Figure 4:
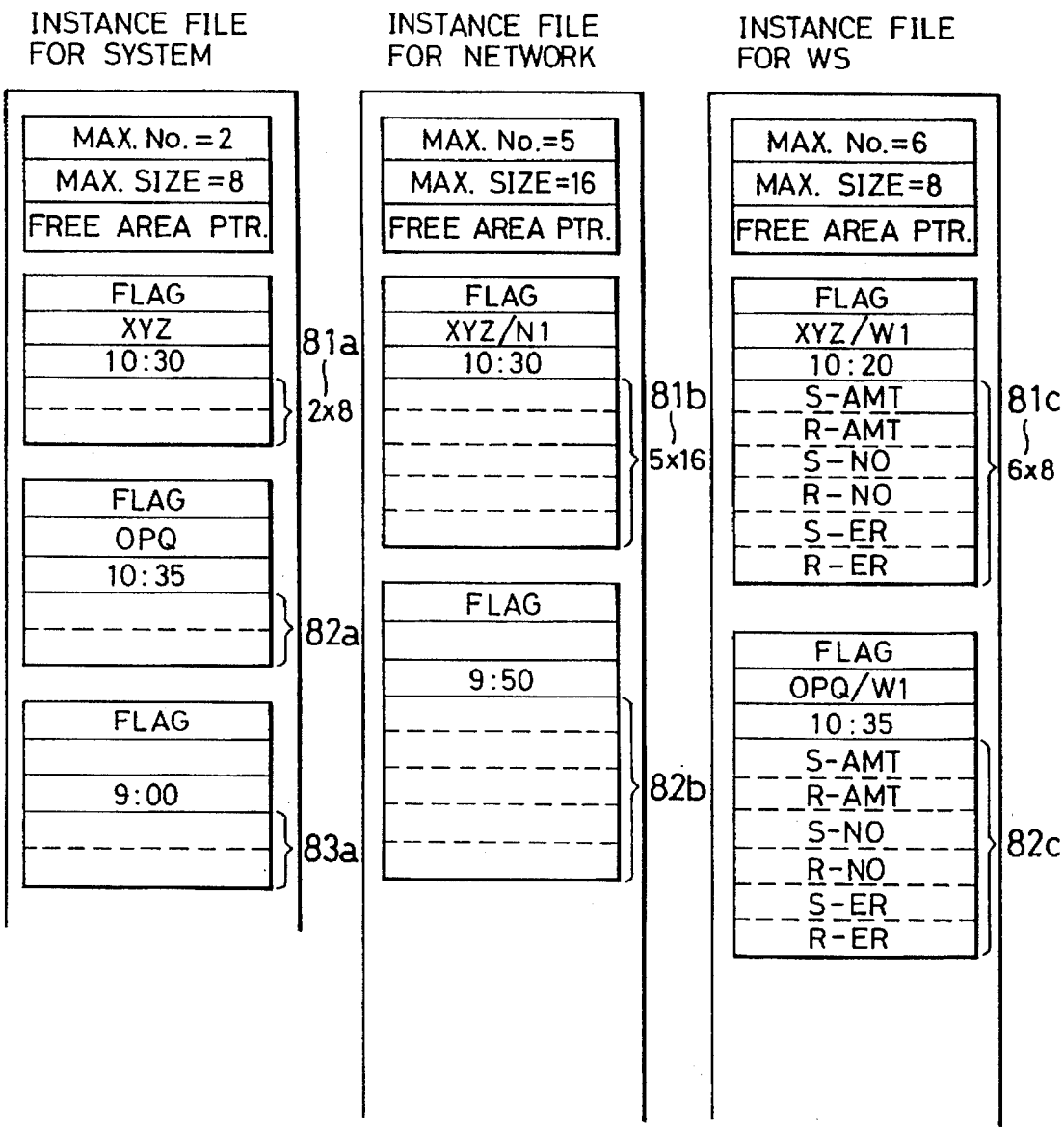
FIG. 4 shows examples of instance files according to the present invention.

FIG. 4 shows three examples of instance files; a system instance file, a network instance file, and a workstation instance file. The number of maximum attributes and the maximum attribute size for the system instance file are 2 and 8 respectively in a particular embodiment. Thus the management information area 81a has the size of 2×8 bytes, that is 16 bytes. Likewise, the management information area 82a also has the size of 16 bytes. If the maximum number of attributes for the network instance file is 5 and the maximum attribute size is 16, then the size of management information areas 81b and 82b amounts to 80 bytes. Similarly, FIG. 4 illustrates the management information areas 81c and 82c of the workstation instance file having the size of 48 bytes.

An example of management information for a workstation instance file is given in FIG. 5. Assuming that a 48-byte management information can be stored in this workstation instance file as indicated in FIG. 4, the management information in this example includes such items as the amount of data, the number of data, and the number of errors the workstation has sent and received.

FIG. 6 explains the name of a containment relationship file. The depth level of a containment tree is used as a file name so that a containment relationship file can be easily and uniquely identified. Numbers contained in a file name stand for the depth levels in a containment tree. In this example, /DB/SUBTREE/1 represents the file name for depth level 1 and DB/SUBTREE/2 represents the file name for depth level 2. The subdirectory DB stands for a subdirectory of an MIB while SUBTREE indicates a subdirectory of a containment relationship file.

Figure 7:
FIG. 7 shows file names of instance files according to the present invention.

FIG. 7 explains a method of naming an instance file. They are named using an object identifier for the class. Object Identifiers are the Identifiers given uniquely based on an inheritance tree. For the class system, values such as 2.9.3.2.3.13 are given as its identifier. A character string expressed with a separator / instead of a separator indicates a file name. If the object identifier for a managed object class "SYSTEM" is "2.9.3.2.3.13" and that for the managed object class "NETWORK" is "1.3.14.2.2.1.5", then the name of the instance file for the managed object class "SYSTEM" will be named /DB/2/9/3/2/3/13i and the instance file for the managed object class "NETWORK" will be named /DB/1/3/14/2/2/1/5i. The lowercase i is suffixed to distinguish files from subdirectories. Names with i are for files whereas those without i are for subdirectories. Therefore, a name/DB/1 indicates a subdirectory and DB/1I indicates a file.

As has been described, the data structure of an MIB is divided into two: the containment relationship files and instance files. While the former stores the containment relationship of instances, the latter stores the management information of instances.

Keeping the containment relationship of instances in the MIB enables dynamic resource management to be directly reflected upon the MIB itself in real time during a network operation.

Using a containment tree, which shows parent to child and brother to brother relations, to express the containment relationship of instances facilitates an efficient search of managed object instances. Because the containment relationship files are named so as to indicate each layer, or depth level, of the containment tree, file names can be easily and uniquely identified and instances can be easily searched. In addition, creating a containment relationship file for each depth level of the containment tree helps save memory resources.

Reserving brother recording areas appropriate for the containment relationship of the managed objects in the containment relationship file eliminates any superfluous memory areas and greatly enhances the high-speed operation, such as adding or deleting instances.

Figure 8:
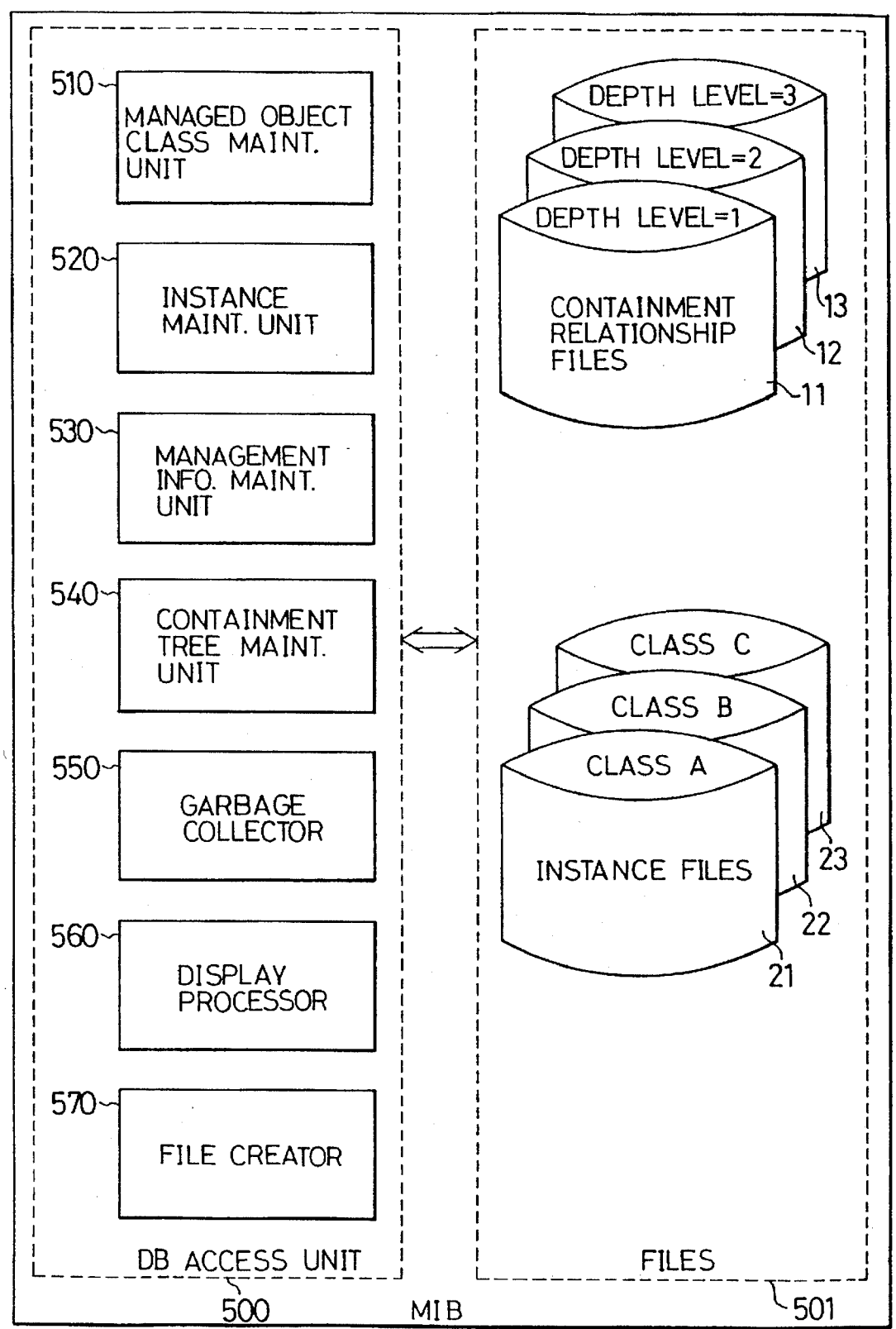
FIG. 8 shows a database access unit: its structure and position in the MIB according to the present invention.

A database access unit 500 is explained using FIG. 8. The database access unit makes an access to files 501 in the MIB 31. The database access unit is provided with several processing units to access the MIB and to prepare the latest data update.

A managed object class maintenance unit 510 creates instance files when a managed object class is added and deletes instance files when the managed object class is deleted.

A instance maintenance unit 520 adds or deletes instances. This unit registers an instance in the containment relationship file corresponding to the depth level to which the instance is to be added. Then the instance is added to the instance file for the managed object class.

A management information size maintenance unit 530 adds new attributes or deletes existing attributes to or from a managed object class.

A containment tree maintenance unit 540 modifies a containment tree by resetting the parent-child or brother-brother pointers, as the configuration of the managed object network is updated.

A garbage collector 550 collects dispersed free areas in the containment relationship files and instance files.

A display processor 560 displays management information in the instance files. An operator grasps the status of the managed objects by monitoring the management information output from this display processor.

A file creator 570 creates containment relationship files and instance files.

Processing performed by each processing unit in the database access unit is explained below.

Processing by the File Creator 570

Figure 9:
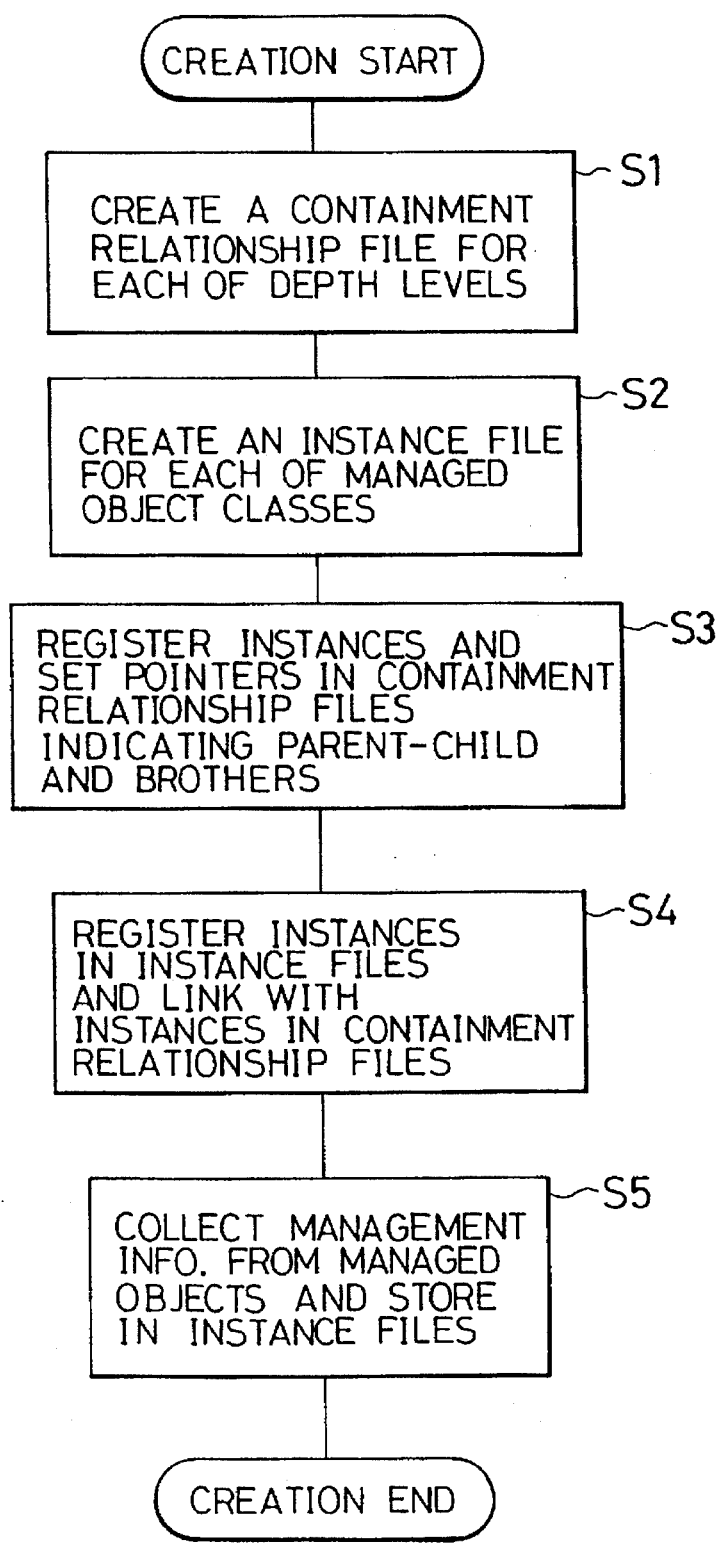
FIG. 9 demonstrates how a file creator creates containment relationship files and instance files.
Figure 10:
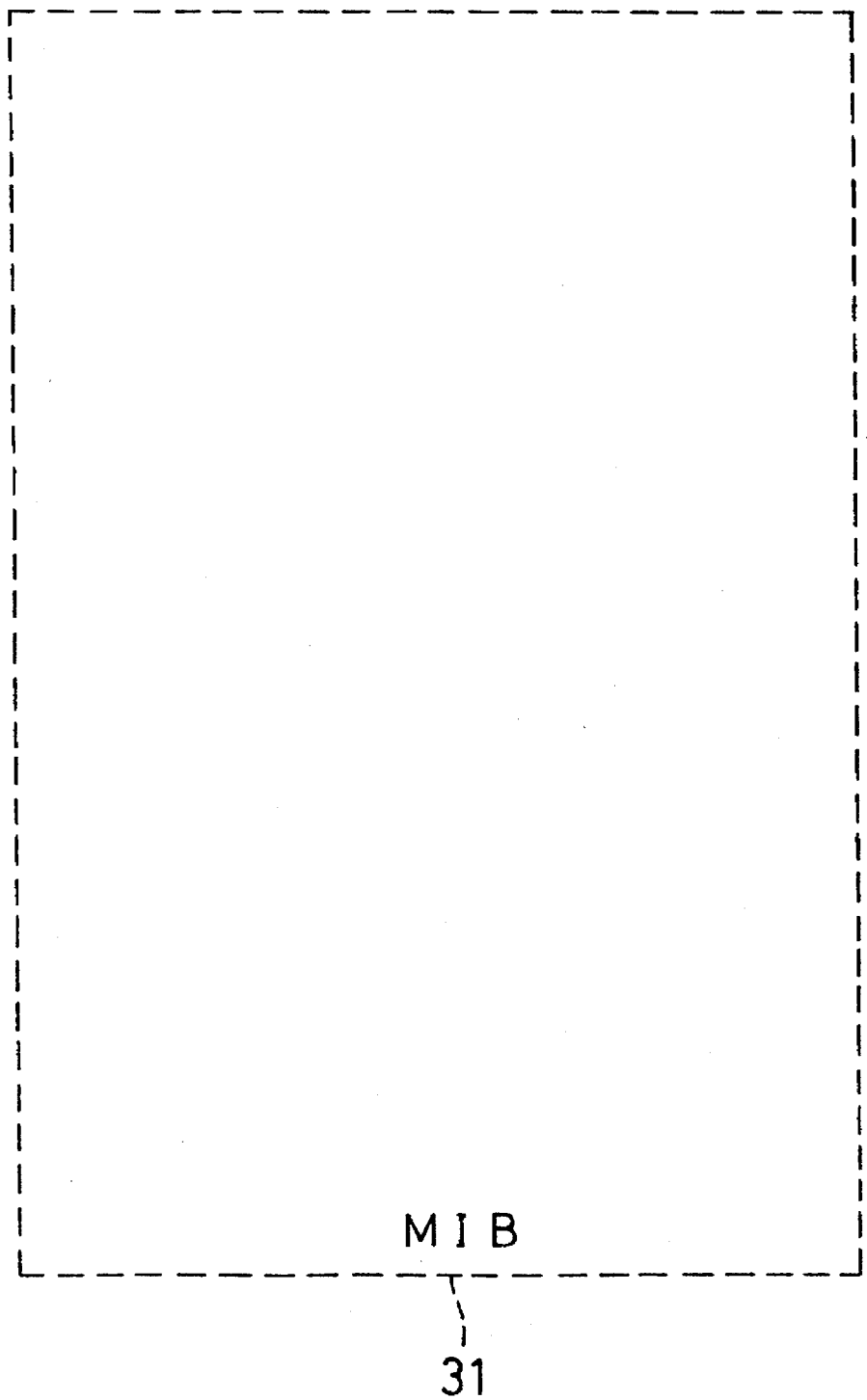
FIG. 10 shows an initial state of an MIB while containment relationship files and instance files are being created by the file creator.

FIG. 9 outlines how the file creator creates a containment relationship file or an instance file. A file creator is executed once when a management information base is created. FIG. 10 shows the initial state of an MIB. Nothing exits since the MIB has not yet been created.

Figure 11:
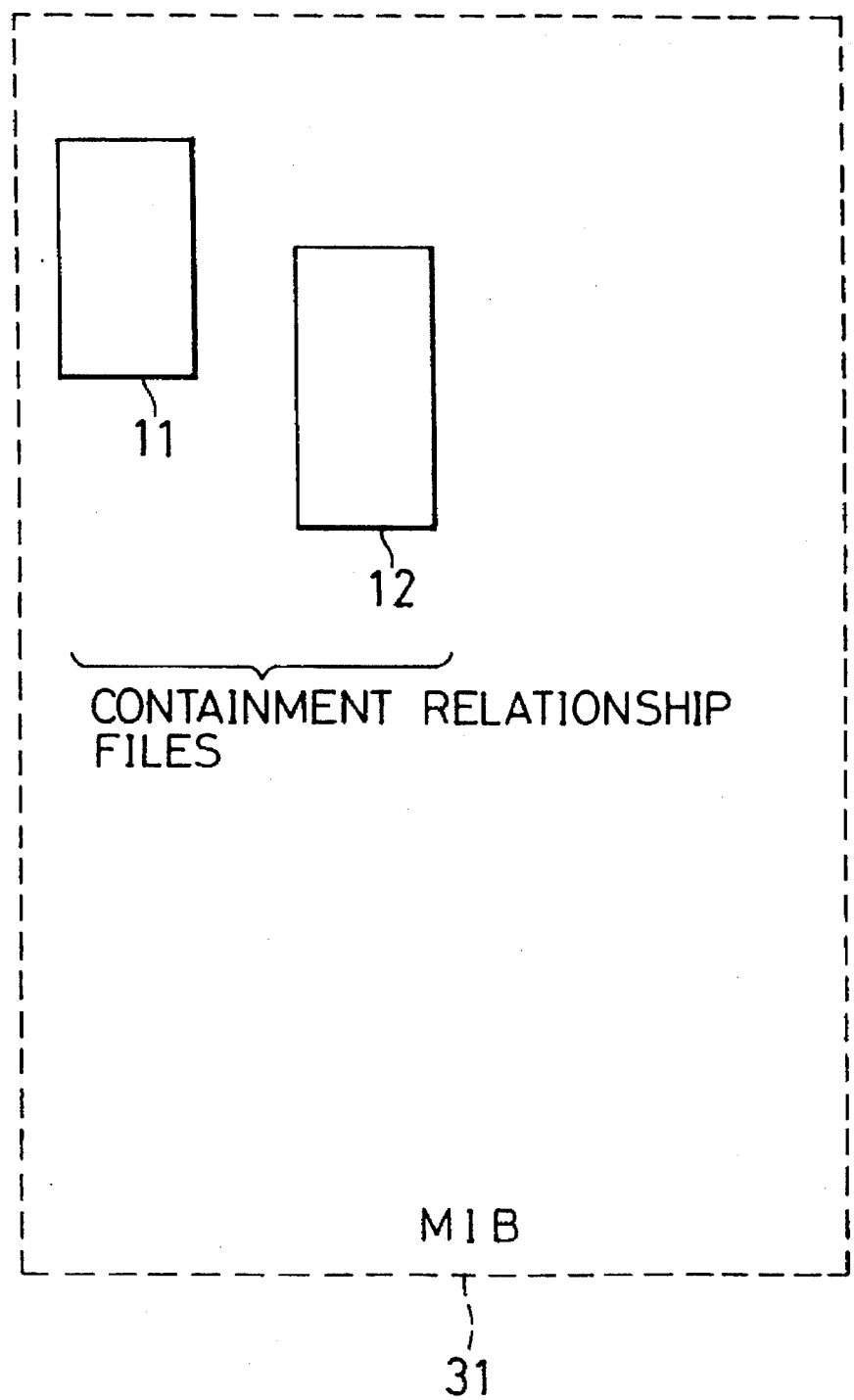
FIG. 11 shows an after S1 state of the MIB while containment relationship files and instance files are being created by the file creator.

At step S1, a containment relationship file is created for each of the depth levels, which is shown in FIG. 11. Only empty containment relationship files exist in the MIB.

Figure 12:
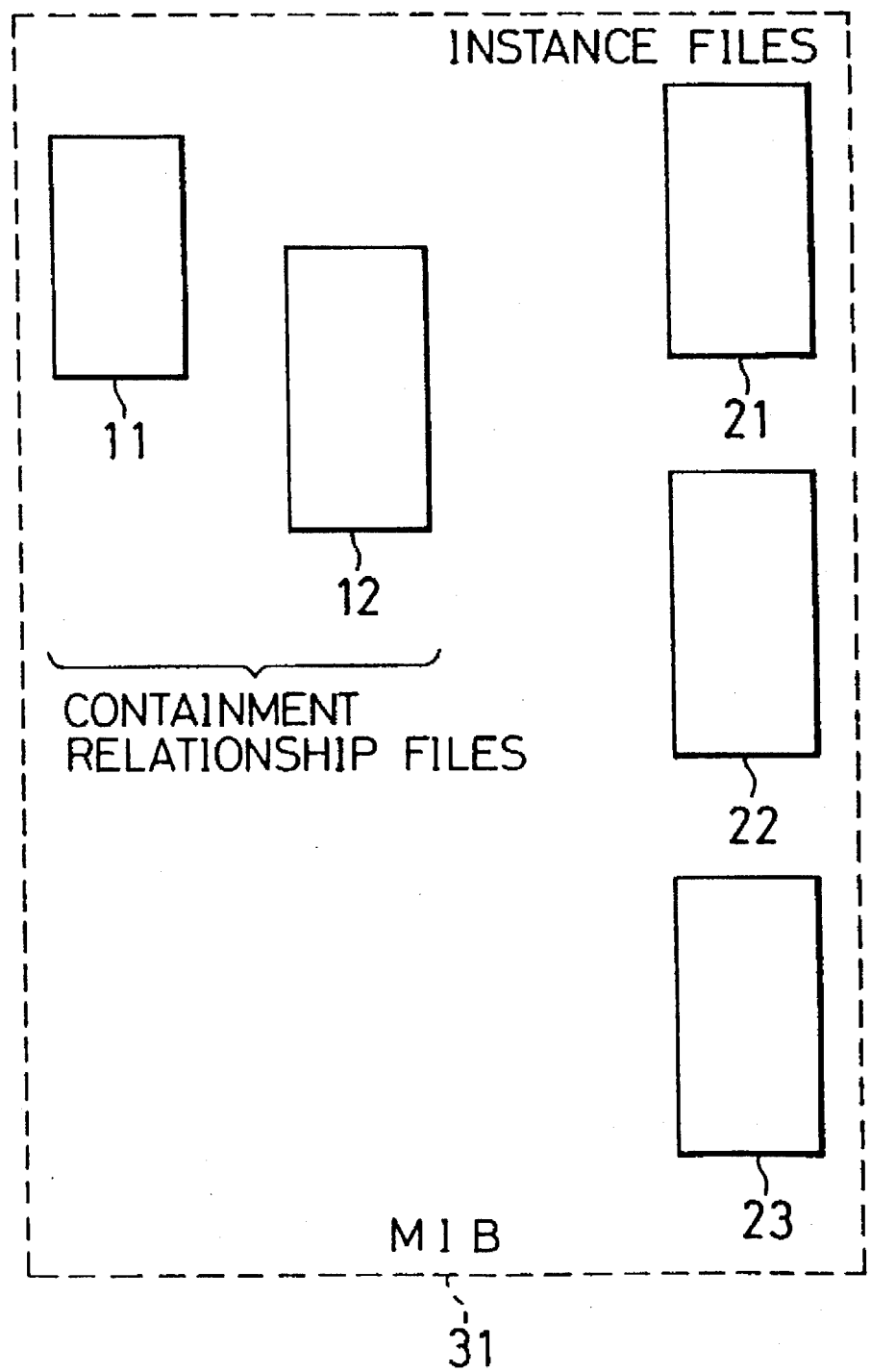
FIG. 12 shows an after S2 state of the MIB while containment relationship files and instance files are being created by the file creator.

At step S2, an instance file is created for each of the managed object class. Here, it does not matter which file is to be created first: it is simply that files are created and they have no registered data yet at this point. FIG. 12 shows this state.

Figure 13:
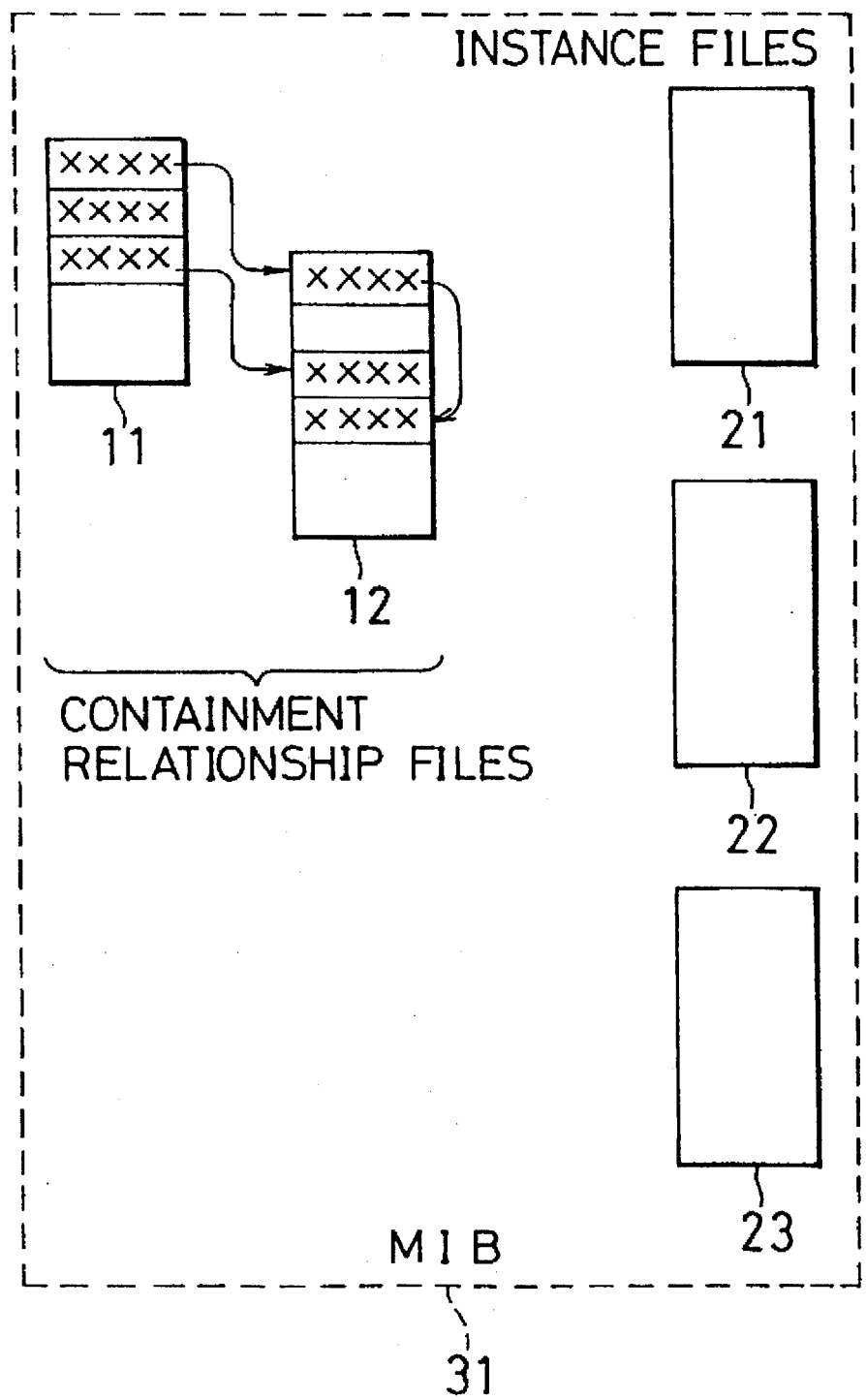
FIG. 13 shows an after S3 state of the MIB while containment relationship files and instance files are being created by the file creator.

At step S3, pointers are set to indicate parent-child and brother-brother relationship. Instances are registered in the containment relationship files. FIG. 13 shows that the pointers are set so that the parent-child relationship of instances is retained among the containment relationship files and the brother-brother relationship of instances is retained in each of the containment relationship file.

Figure 14:
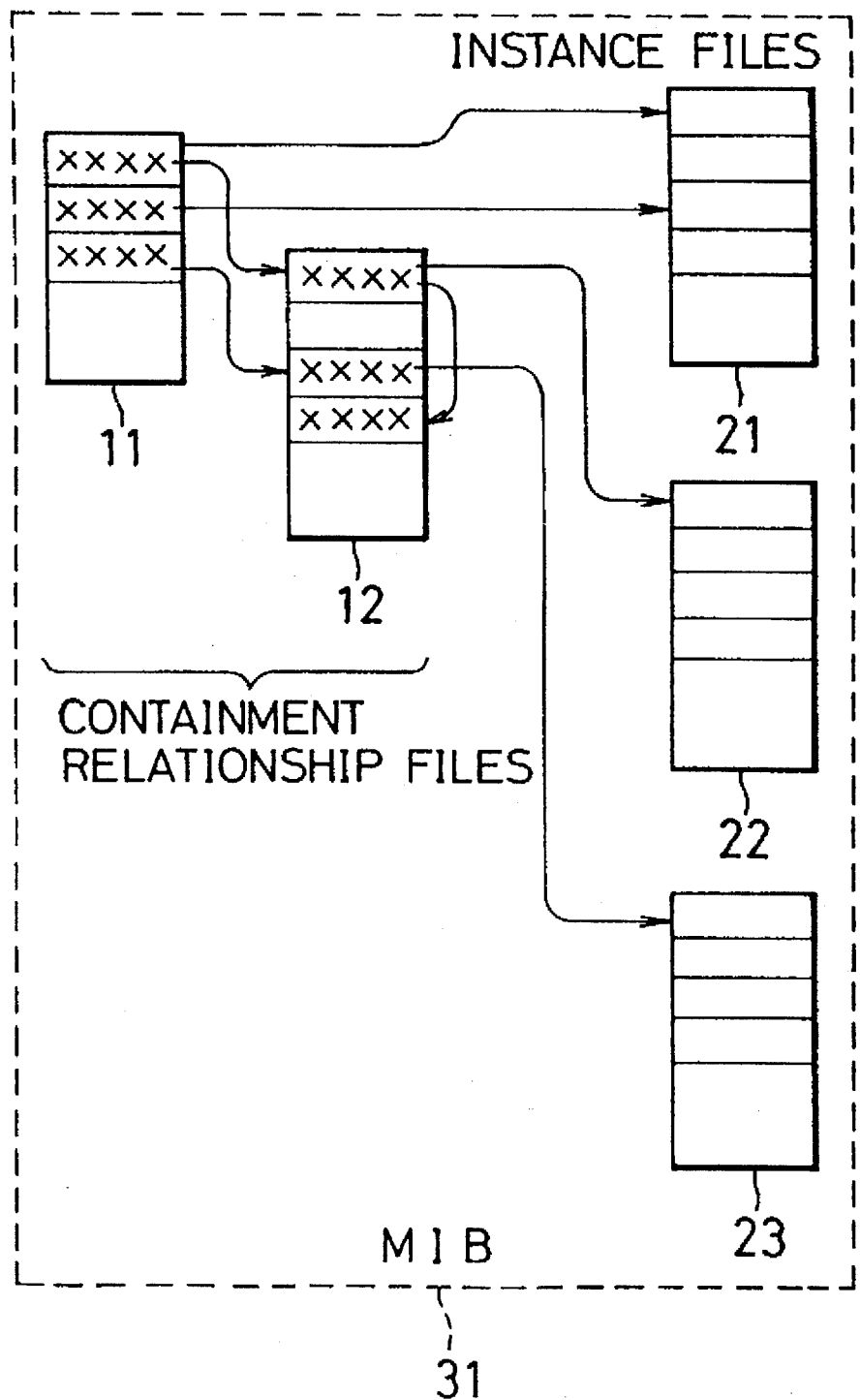
FIG. 14 shows an after S4 state of the MIB while containment relationship files and instance files are being created by the file creator.

Then at step S4, an instance of a managed object is registered in an instance file and then linked with a containment relationship file. At this point, the instance registered in the instance file only has management information areas and no attribute values are yet obtained. FIG. 14 shows this state.

Figure 15:
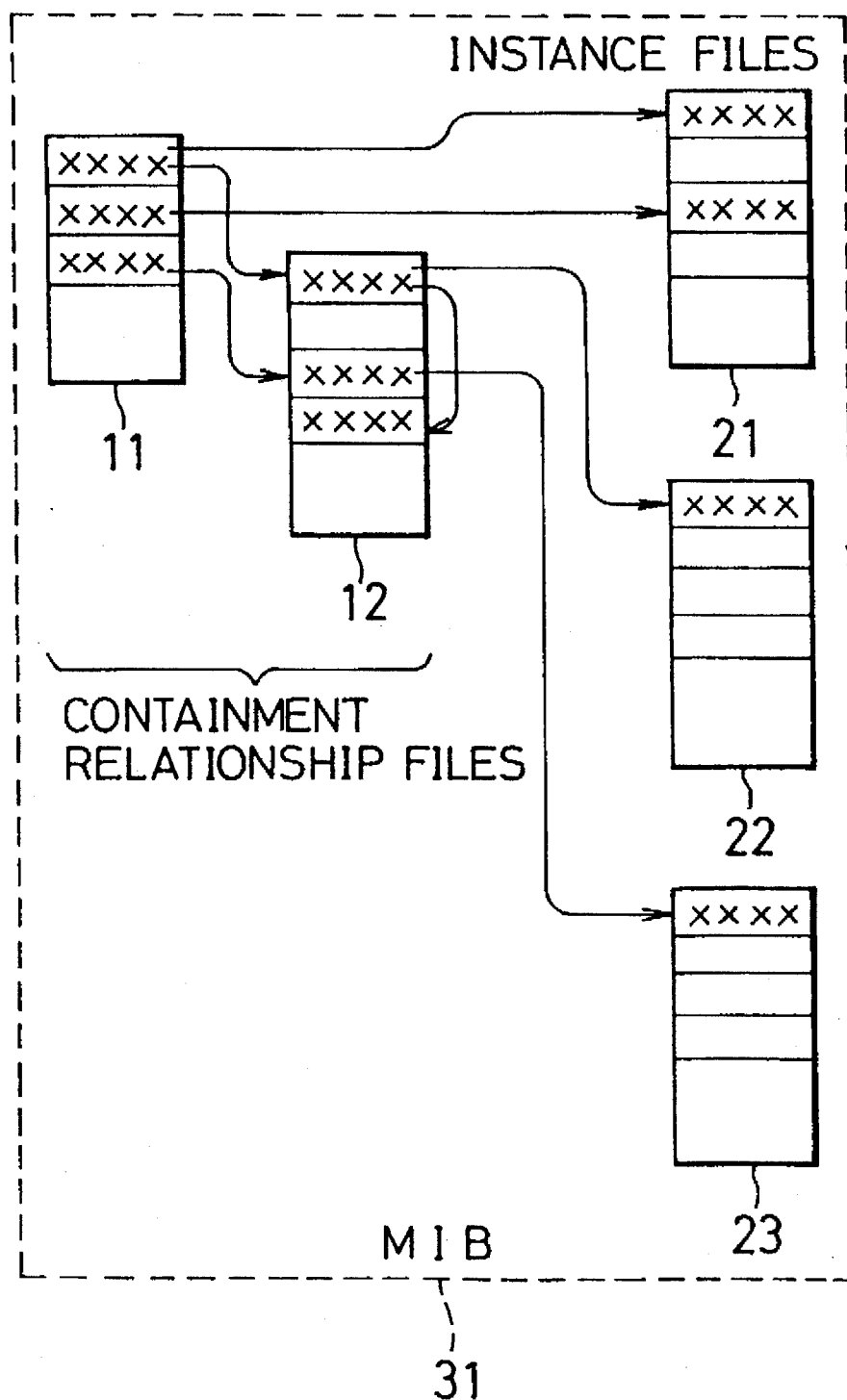
FIG. 15 shows an after S5 state of the MIB while containment relationship files and instance files are being created by the file creator.

Then FIG. 15 shows, at step S5, management information is obtained from the managed objects, and the obtained attribute values are stored in the instance file as the management information of the instance.

In this way, the network management is started when all the following five processing is complete:

creation of containment relationship files for each depth level of a containment tree, registration of relations of instances in those containment relationship files, to store parent-child relationships of instances among the containment relationship files and to store brother-brother relationships in each of the containment relationship files, creation of instance files for each managed object class registration of relations of instances in the instance files, and storing of the collected management information in the instance files.

When the containment relationship files and instance files have been created by the file creator, management operation is ready to start. Creation of new instance files after this initial file creation and addition of new instances to the instance files are explained below in connection with a managed object class maintenance unit 510 and an instance maintenance unit 520.

Processing by the Managed Object Class Maintenance Unit 510

The managed object class maintenance unit 510 adds or deletes managed object classes to the MIB. When a managed object which belongs to a new managed object class is to be added to the managed object network, instance files for the new managed object class must be created. An object identifier, for identifying the managed object class as shown in FIG. 7, is used as the name of the created instance files.

The instance files are initially created containing only the maximum number of attributes, the maximum attribute size of the managed object class, and the initial-state free area pointer. Instance files in this initial state can be prepared in real time even during online operation. In creating an instance file, the other instance files must first be placed under exclusive control so as to block any attempted access to the other instance files.

To add an instance for the added managed object class, the name of the instance file can be identified by the object identifier of the managed object class. In this way, instances to be added are stored in the prepared instance file. When a managed object class is newly added, the containment relationship files need not be modified, and the managed object class maintenance unit performs no special processing on the containment relationship files.

As described, when a new managed object class is added by the managed object class maintenance unit, new instance files are created for the class. This enables dynamic creation of the managed object class in the network. Moreover, creating only necessary files results in saving memory resources.

If a managed object is deleted from the managed object network by deleting the managed object class for the managed object, the instance files for the managed object class are deleted.

The instance files for the managed object class are searched to obtain the name of the registered instances. The registered instances are then deleted from the containment relationship file and from the instance file with this obtained instance name. The process of deletion of instances is explained later.

The above processing is repeated until all the instances to be deleted, which are registered in the instance files of the class, are deleted. Then the instance files are deleted. The managed object class can be deleted during online operation by placing the MIB database under exclusive control.

Processing by the Instance Maintenance Unit 520

The functions of instance maintenance unit 520 are twofold: It maintains the containment relationship files and the instance files.

When a new managed object is added to the managed object network, the instance maintenance unit adds the managed object to the containment relationship file and to the instance file as an Instance; conversely, the instance maintenance unit deletes an instance from the containment relationship file and from the instance file when a managed object is removed from the managed object network.

To add an instance to a containment relationship file, a containment relationship file of the depth level appropriate for the instance is first searched to find a brother recording area to store the instance. If the brother recording area is already occupied with other brothers, the instance is stored in the free area of the brother recording area.

If the instance has no brothers, a brother recording area must first be reserved. When the instance is stored in the brother recording area, the area is pointed to from the parent.

When an instance with a child is to be deleted from a containment relationship file, the deletion instruction will be rejected unless an option for progeny deletion is specified. That is, when an instance having a child is to be deleted, the option for deleting progeny must be selected to delete not only the instance but also its progeny.

An instance with no children can be simply deleted. If the instance does not have any other brothers, that is, if the instance is the only child to its parent, the brother recording area is released and the pointer from the parent to the instance is cleared.

When the instance, to be added to an instance file, has been successfully added to the containment relationship file, management information is stored in the instance file of the class to which the instance belongs, and the pointer on the containment relationship file points the address at which the management information has been stored.

When the instance, to be deleted from the instance file, has been successfully deleted from the containment relationship file, the instance is deleted from the instance file as well.

When the instance has been added both to the containment relationship file and to the instance file, the flags are set to on. Similarly, the flags are set to off when the instance is deleted.

In summary, a new instance will be added to a containment relationship file for the depth level and to the instance files for the managed object class. Then a pointer is set from the instance in the containment relationship file to access the instance in the instance file. In this way, dynamic addition or deletion of instances is realized.

Processing by Management Information Size Maintenance Unit 530

Attributes will be added to or deleted from the managed Object class as explained below.

Adding attributes may require either increasing the maximum number of attributes or expanding the maximum attribute size of the management information area an instance has.

Figure 16:
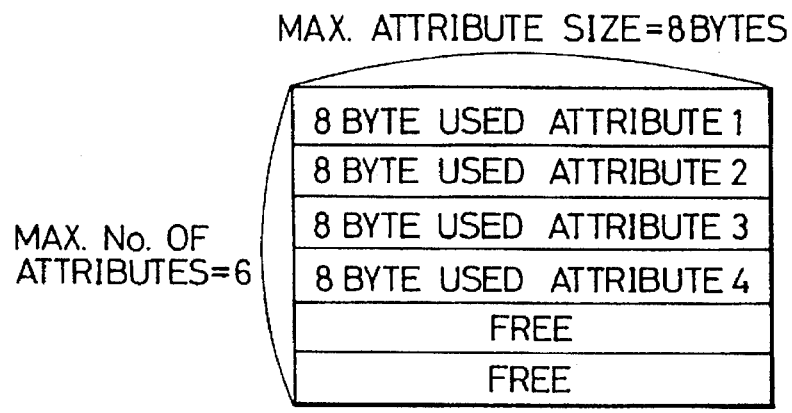
FIG. 16 gives the maximum number of attributes and the maximum attribute size according to the present invention.

An example of management information area given in FIG. 16 shows that the maximum number of attributes is 6 and the maximum attribute size is 8 bytes. Four attributes, attributes 1 through 4 are already stored as the management information. If a new attribute is to be added, the fifth attribute will be stored in the existing free area. If, however, three more attributes must be added, because only two free areas are available, the total number of attributes exceeds the maximum number of attribute areas available.

On the other hand, if the size of attribute 4 is to be changed to 32 bytes, the recording area is insufficient. Accordingly, the process for increasing the maximum number of attributes or for changing the maximum size of attributes is explained below. Attributes are deleted in the same way as explained below. However, this processing is unnecessary if adding or deleting an attribute does not affect the maximum number of attributes and the maximum attribute size of the instance file.

When the maximum number of attributes or the maximum attribute size of the instance file must be changed as a result of adding or deleting an attribute, a temporary file will be created. The temporary file, at this stage, contains only the maximum number of attributes and the maximum attribute size after the attribute is added or deleted, and the free area pointer in the initial state. The recording areas of the temporary file depend on the maximum number of attributes and the maximum attribute size set for the temporary file.

Figure 17:
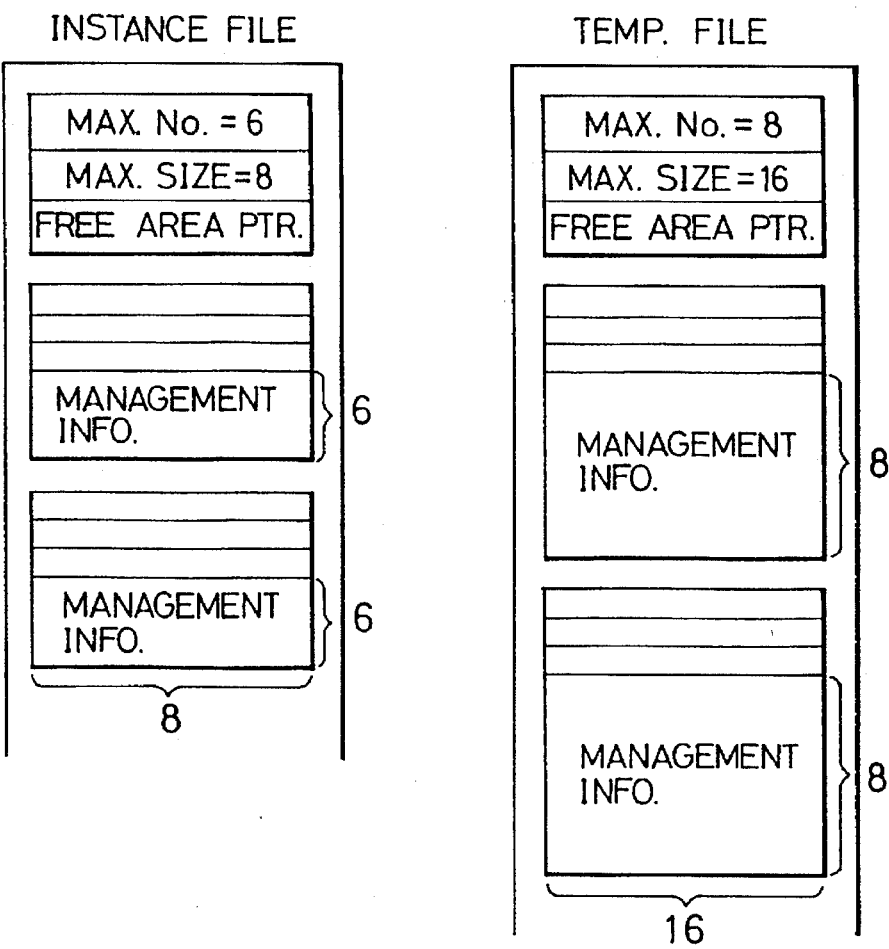
FIG. 17 shows how a management information size of an instance file can be temporarily modified according to the present invention.

FIG. 17 shows an instance file and a temporary file. The temporary file is created due to a change made in the maximum number of attributes and maximum attribute size of the instance file. The maximum number of attributes in the instance file is increased from 6 to 8 while the maximum attribute size is expanded from 8 to 16. Then, the free area pointer in the instance file is copied into the free area pointer in the temporary file. The content in each recording area in the instance file is moved into the identical recording area in the temporary file.

If an attribute is to be deleted, the management information is copied from it after the attribute has been deleted. After all the contents have been moved, the instance file will be deleted and the name of the instance file will be reused as that of a temporary file. By implementing an exclusive control over the entire MIB database, attribute addition or deletion can be done, up to this point of renaming the temporary file, even during the online operation.

At this point, the new instance file is nothing more than a copy of the original instance file, and thus the data in the new file remains intact. Therefore, the attribute values of the instances registered in the new instance file are collected to have the management information updated.

Referring to FIG. 5, to add a new attribute of operating time to the management information, the manager instructs the agent to report the operating time of each managed object because the values of this new attribute are not yet registered. Upon receiving the attribute values of operating time from the managed objects, the agent stores the information in each instance and updates the management information for the instance file.

As has been described, classes assigned for the managed objects can have more than one instance file. When it is required to add or delete a managed object class, the addition or deletion of the class is instantaneously reflected upon the MIB even when the network is being run. Furthermore, by collecting instances having the same number of attributes and the attribute size into one file, resources can be saved or reused as instances are added or deleted. The maintenance of the MIB is also simplified. An instance file has a recording area in which the size of the management information of instances are to be stored. This makes it possible to set a management information size matched with the attributes of the managed object class. Instead of having the type of attributes for each class, the maximum number of the attributes and the maximum attribute size that instances can possibly hold for each class are set for the management information recording areas. The addition or deletion of attributes is easy, and further serves the purpose of saving memory resources to a great extent.

The management information size maintenance unit also recreates an instance file based on the changes made to the management information size, allowing one to add or delete attributes dynamically during an online operation without recompiling or relinking programs as has been required heretofore.

Processing by the Containment Tree Maintenance Unit 540

This section explains the method of changing a containment tree according to the changes made to the network configuration of the managed objects.

How a new containment relationship of instances is reflected upon the database is explained below, referring to FIG. 18, where the instance containment relationship is changed from 141 to 142 at its branchpoint 131. Instances from 131 to 136 comprise a network. The containment relationship 141 of instances shows a status prior to the changes in the network configuration and the containment relationship 142 shows the status after such change. Containment relationships 145 and 146 show various states of the database as the containment relationship undergoes changes, in the course of changing containment relationship from 141 to 142.

If a network is reconfigured, the agent recognizes the changed containment relationship 142 upon receiving the information from the managed object network. Because the manager retains the original containment relationship 141, there occurs a gap of cognizance between the agent and the manager concerning the containment relationship. In order to recognize the same containment relationship as the agent does, the manager performs the following:

Via the agent, the manager obtains instances one level lower than the instance 131 to which the changes are made using the OSI management protocol, and thus obtains the instances 132 and 135. Because the containment relationship 141 is still in the database managed by the manager, the instance 135 is added and the containment relationship 145 is obtained.

Again via the agent, the manager then proceeds to obtain an instance one level lower than the instance 132 using the OSI management protocol, resulting this time in obtaining the instance 133. Because the containment relationship 145 is still on the database managed by the manager, the instance 134 is deleted, and the containment relationship 146 is obtained.

The manager obtains a sub-level instance of the instance 135, i.g., instance 136, using the OSI management protocol. The instance 136 is then added to the containment relationship 146 still retained in the database managed by the manager.

If the same processing is carried out for the instances 133 and 136, the containment relationship will remain unchanged because these instances have no sub-level instances. Therefore the containment tree in the database for network management will become identical to the containment relationship 142, matching the network configuration of the actual managed objects.

Figure 18:
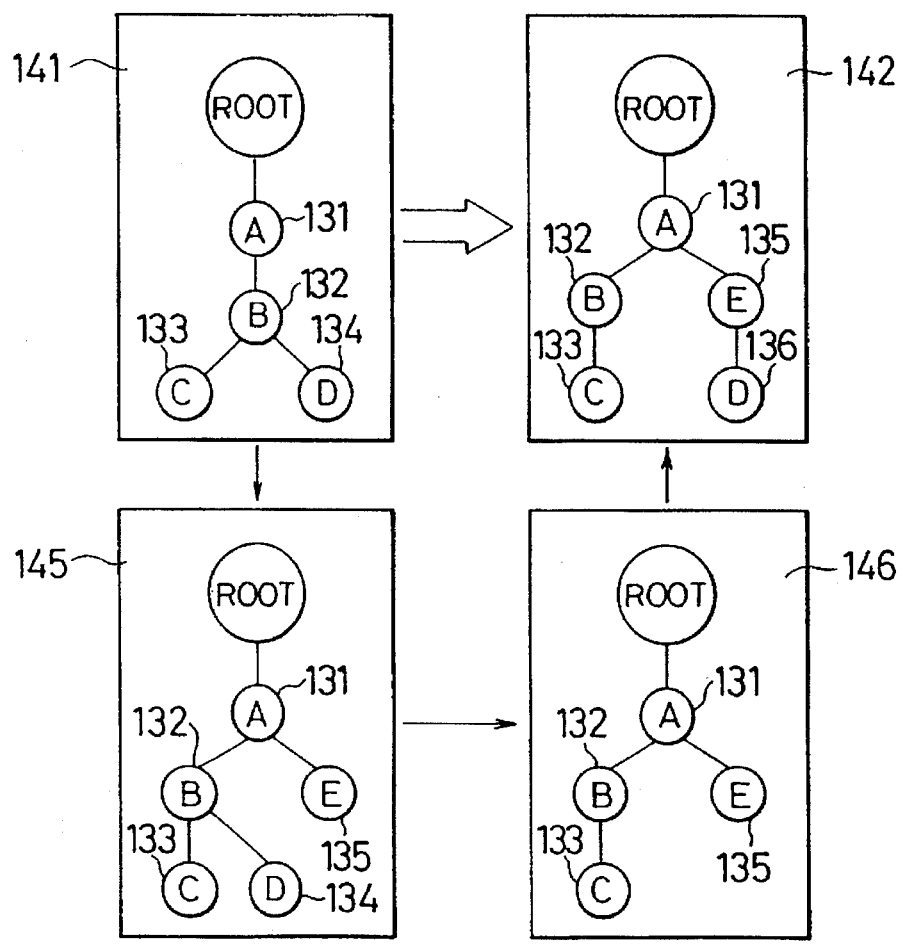
FIG. 18 illustrates how a containment tree in a database can be changed according to the present invention.

If a branchpoint instance from which the containment tree is to be changed, the instance 131 in case of FIG. 18, is unknown, the manager can update the database by matching the structure of the containment tree to the changed containment relationship, layer by layer from the root.

Each time a network configuration of managed objects is changed, the containment tree maintenance unit is directly responsible for changing the containment tree by resetting pointers between the parent-child or brothers. Thus the managed object network can be flexibly reconfigured even during network management operation.

Processing by Garbage Collector 550

In the database structure heretofore explained, areas in the containment relationship files or the instance files may lie unused waste due to the addition or deletion of instances. This section explains how those waste areas are deleted by the garbage collector 550.

Garbage in a containment relationship file can be collected by either of the following two methods: In a first method, referring to FIG. 2, as is indicated by the pointer 121, if the brother recording areas are the scattered into several different areas and if the following equation is valid, scattered brother recording areas are collected into one or two larger areas so as to increase the free brother recording areas. The total of brothers=<(the number of brother recording areas currently used−1)×(the maximum number of brothers that can be stored in one brother recording area)

Figure 19A:
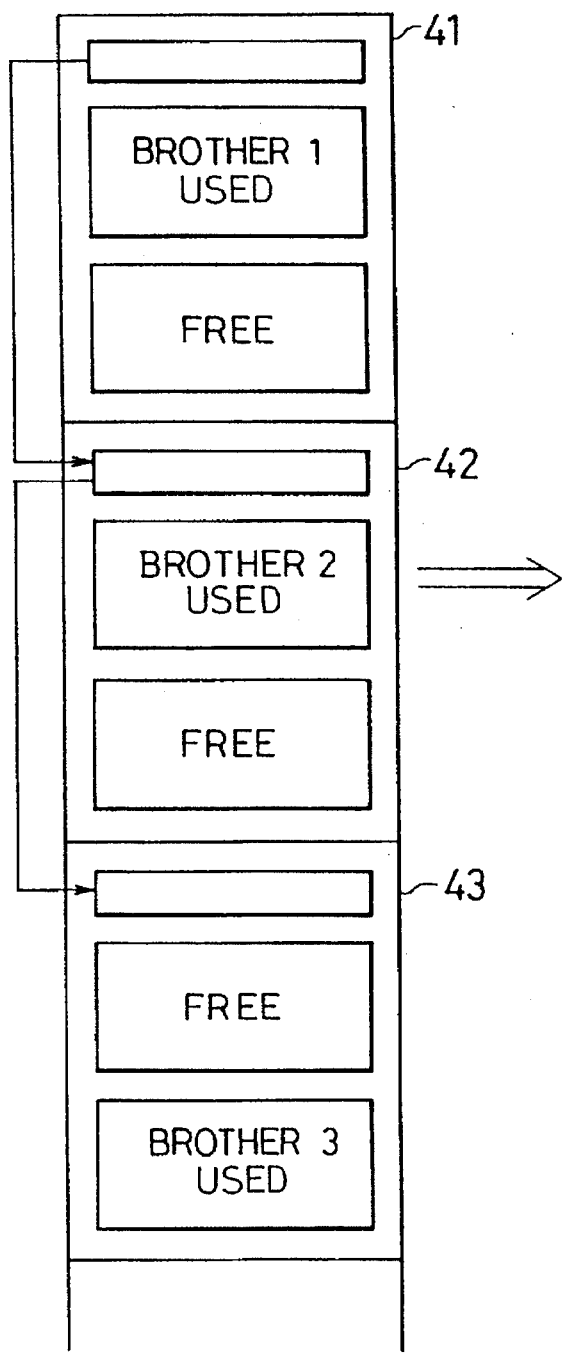
FIG. 19 gives an example of collecting brother recording areas in a containment relationship file according to the present invention.
Figure 19B:
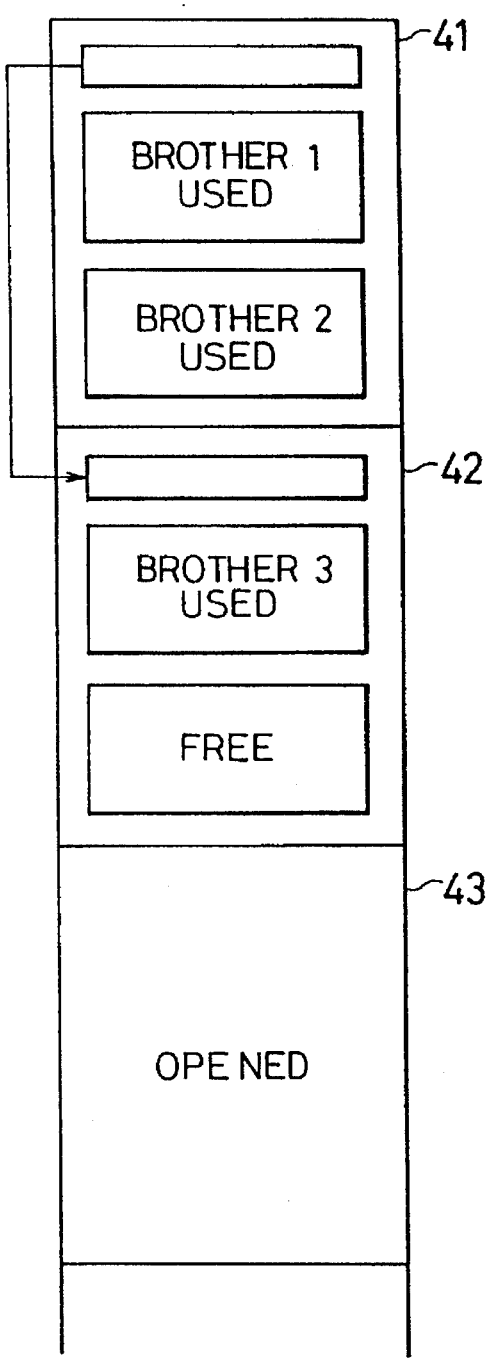

FIG. 19 shows two containment relationship files 11(a) and 11(b). In 11(a) and 11(b) of FIG. 19, brothers 1, 2, and 3, are stored in the containment relationship file. Each of three brothers use the brother recording areas 41, 42, and 43 respectively. The maximum number of brothers that can be stored in a single brother recording area is two, therefore the above-mentioned equation is valid. Thus brothers arbitrary stored in three different areas can be consolidated into smaller areas. 11(b) of FIG. 19 shows that these three bothers are collected into the brother recording areas 41 and 42, thus making the brother recording area 43 open.

Figure 20A:
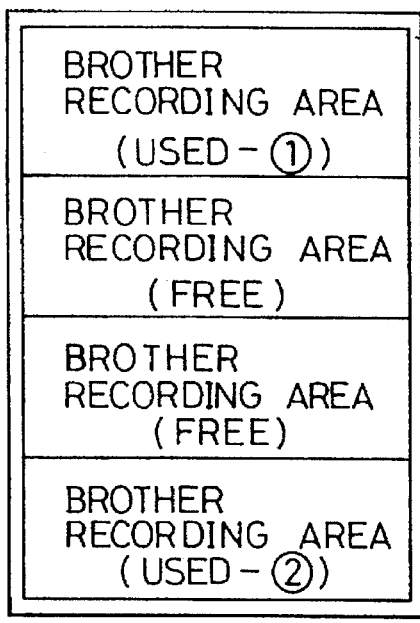
FIG. 20 illustrates an example of garbage collection for a containment relationship file according to the present invention.
Figure 20B:
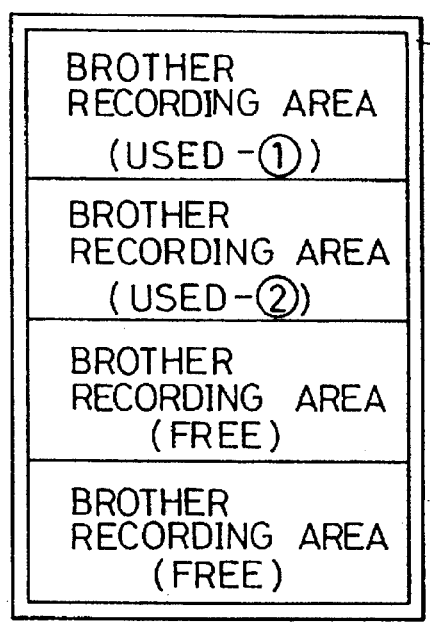

FIG. 20 shows a second method of how used brother recording areas in a containment relationship file are sorted after an instance is added or deleted. 201 of FIG. 20 shows unsorted brother recording areas, either used or free. 202 of FIG. 20 shows the sorted brother recording areas as a result of garbage collection of the containment relationship file. When used and free brother recording areas are randomly located in a file for a certain level of depth as shown in 201 of FIG. 20, the contents of used brother recording areas will be shifted to the free brother recording areas positioned closer to the top of the file than the current used brother recording areas. Then the parent-child pointer of the brother is reset. This processing is repeated until used brother recording areas are successively aligned from the top of the file followed by the free brother recording areas. The used brother recording areas are copied into a temporary file one by one from the top of the file. Then the temporary file is overwritten onto the original containment relationship file. AS the temporary file is deleted, garbage collection for the containment relationship file is complete.

Figure 21A:
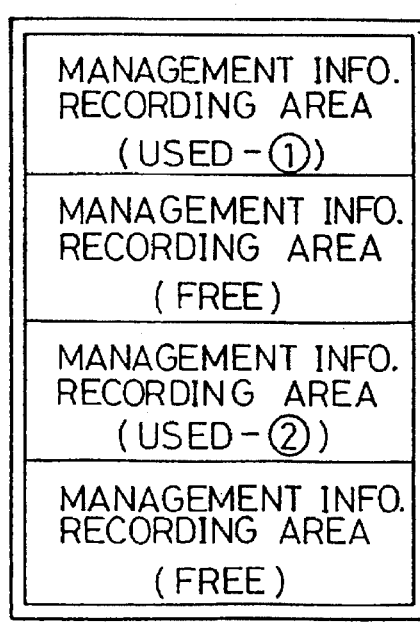
FIG. 21 illustrates an example of garbage collection for an instance file according to the present invention.
Figure 21B:
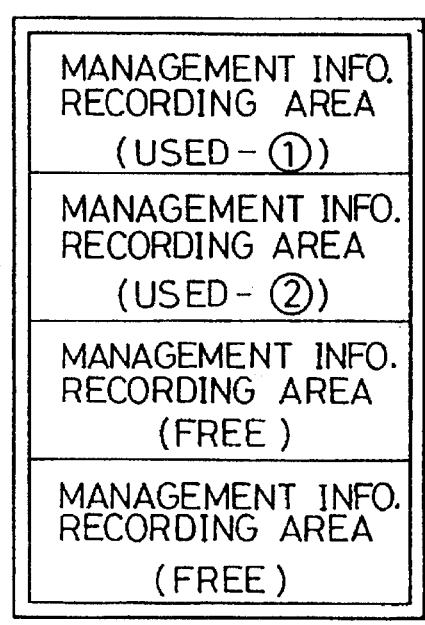

FIG. 21 shows an example of how garbage is collected for an instance file. In 203 of FIG. 21, used and free management information recording areas are randomly located in an instance file as a result of adding or deleting an instance. On the other hand, 204 of FIG. 21 shows the sorted recording areas for the used and free management information after garbage in the instance file is collected.

If the used and free management information recording areas are randomly located as shown in 203 of FIG. 21, the contents of the used management information recording areas is shifted to the free management information recording areas positioned closer to the top of the file than the current used management information recording areas. The instance pointers for the containment relationship files are also reset toward the shifted destination. This processing is repeated until all the used management information recording areas are successively aligned from the top of the file followed by the free management information recording areas as shown in 204 of FIG. 21. Then all the used management information recording areas are copied into a temporary file from the top of the file. Then the content of the temporary file is overwritten onto the original instance file. The temporary file is then deleted, thus resulting in obtaining more open areas in the file.

The garbage collection thus makes it possible to eliminate waste areas in files even during the online operation by placing the database under exclusive control. The garbage collector collects garbage in the containment relationship files or in the instance files to save memory resources for the efficient management networking.

Processing by Display Processor 560

Figure 22:
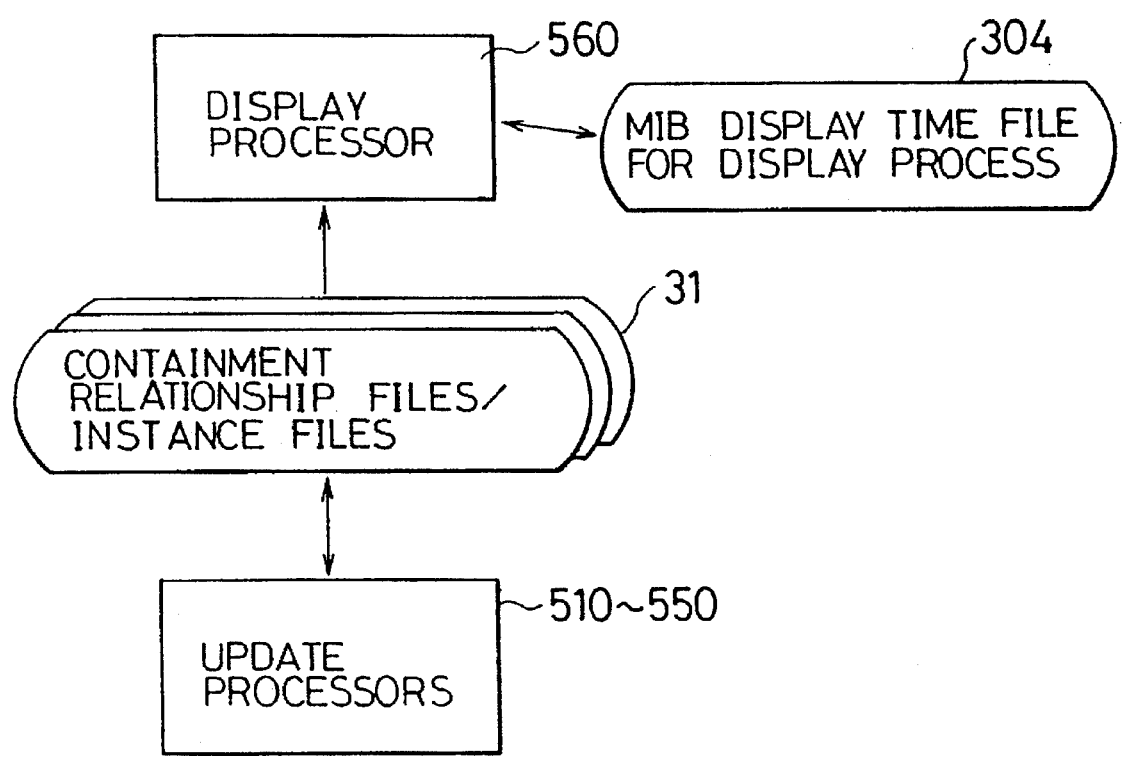
FIG. 22 shows an example of a configuration of a network management apparatus according to the present invention.

FIG. 22 shows one example of a configuration of a network management apparatus provided with an MIB based on the data structure according to the present invention. The MIB 31 here shows the data structure according to the present invention. Processors 510 through 550 update databases and are not interfaced with a user whereas the display processor 560 displays the content of the MIB to the user. File 804 stores the time when the display processor finishes the MIB display processing.

Even while the MIB displaying is not performed, the update processors update the MIB and the updating time of each instance is updated. When the display processor is started, the previous MIB display processing end time is compared with the update time in the instance file. The display processor displays the management information of the instance which is more recently updated than the previous MIB display processing end time.

For instance, if the MIB display time file for display processing stores 10:00 as the display processing end time and the display processor 560 is started after that, an update time of an instance more recent than that 10:00 time is selected for display. The content of the MIB is therefore not necessarily displayed constantly, realizing an efficient network management system operation. Update time of instances can be kept either in containment relationship files or in the instance files.

The display processor displays the MIB management information based on the comparison between the update time of the management information of each instance and the display processing end time. This renders it no longer necessary to continuously display the management information, thus enables efficient network management system operation.

As has been explained so far, the main feature of this example is that the internal structure of an MIB is divided into two parts: one to store the containment relationships of instances and the other to store the management information of the instances. More specifically, the management information of the instances are stored separately for each managed object class.

In addition, the maximum number of attributes and the maximum attribute size that an instance can possibly have are included within the management information recording areas of each managed object class.

Furthermore, the containment relationship of instances is stored by each depth level of a containment tree.

Furthermore, the update time of each instance management information is stored in the management information recording area.

The database of this example has two major internal structures: one to represent the containment relationship among the instances and the other to store the management information each instance has. The containment relationships of instances can be freely added or deleted using the parent-child or brother-brother relationship.

Containment relationship files are created on the basis of the structure of a containment tree. Because each depth level or layer of the tree has the maximum number of brothers to be stored in one brother recording area, values appropriate for the containment relationship of managed objects can be set. This reduces the need to reserve unnecessary areas.

Instances are sorted according to the class they belong to. Because each instance file can hold the maximum number of attributes and the maximum attribute size, the size of the management information recording areas is predetermined, realizing optimum resource utilization.

Embodiment 2

Figure 23:
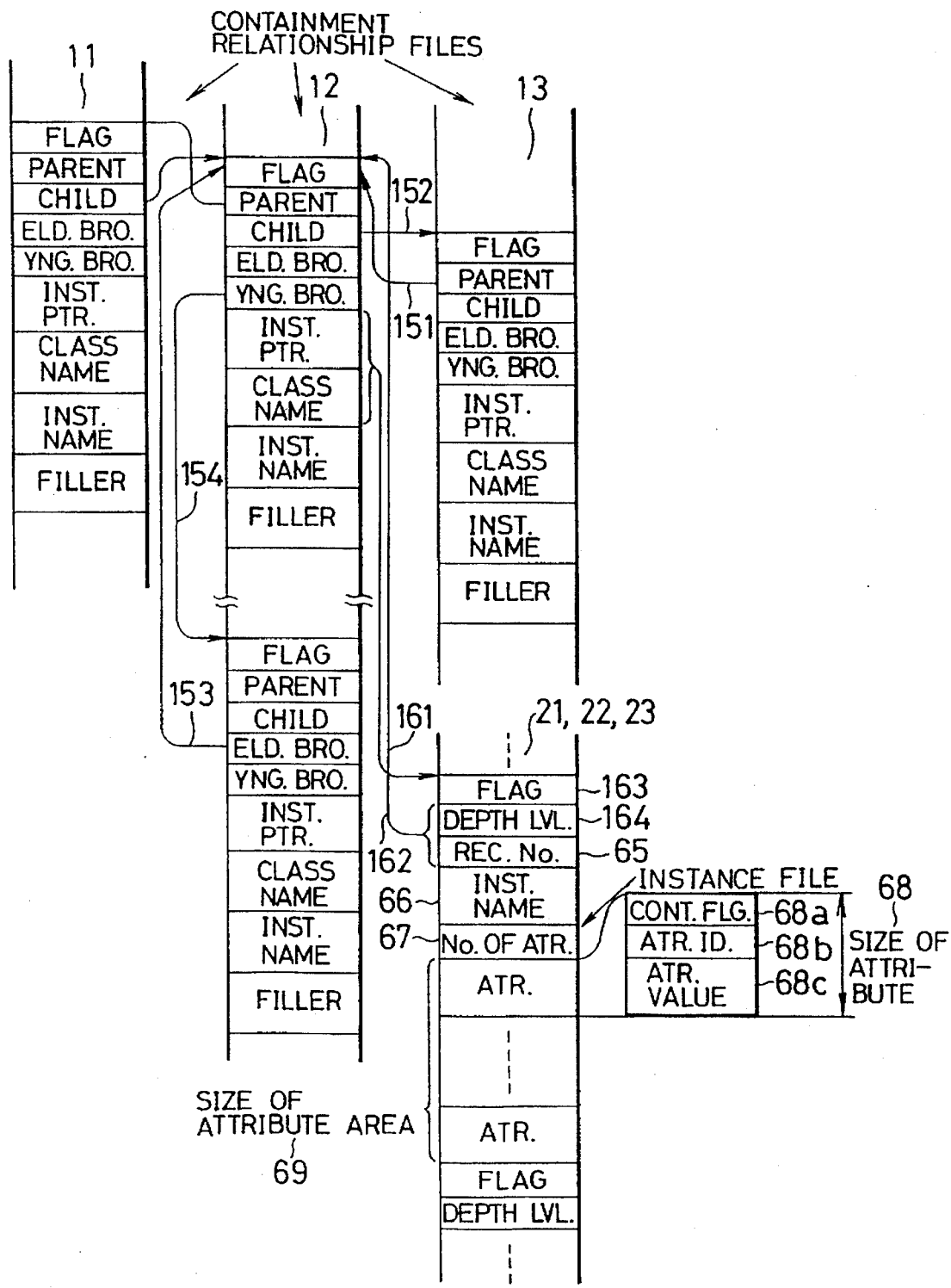
FIG. 23 shows another example of a MIB: the structure of containment relationship files and instance files according to the present invention.

Another example of the present Invention is explained below with FIG. 23. In the figure, containment relationship files 11, 12, and 13 are provided for the depth level 1, 2, and 3 respectively. The containment relationship is expressed by the containment relationship files. Instance files 21, 22, and 23 are created for each class, and store the management information. Pointers 151 and 152 point to their own parent or child and pointers 153 and 154 point to elder or younger brother. Pointer 161 points to the relevant instance in the containment relationship file using the depth level of the containment tree and the record number. Pointer 162 points to the relevant instance in the instance file using the class name and the instance pointer.

Flag 163 is used for free area management. Depth level 164 indicates the depth level of a containment tree. The identifier of the instance is stored in instance name 66. The number of attributes each instance uses is stored in number of attributes 67. Attribute 68 has an area large enough to store the maximum value of attributes of each class. Size of attribute area 69 reserves the area appropriate for the maximum number of attributes each class has. The attribute consists of a control flag 68a, an attribute ID. 68b, and an attribute value 68c. Control flag 68a is used for controlling when the attribute value 68c is accessed. Information such as access time, the number of accesses that have been made, etc. are stored. An identifier that identifies the type of attribute value 68c is stored in the attribute ID. 68d.

Embodiment 2 differs from embodiment 1 in that parent and child or elder and younger brothers point to each other: while in embodiment 1, only an elder brother has a pointer to a younger brother. In the same manner, a child also has a pointer to its parent whereas only a parent has a pointer in embodiment 1. Moreover, both containment relationship files and instance files have pointers to point to each other in this example as opposed to that only containment relationship files have pointers to point to instance files in the previous embodiment.

This mutual reference between instances and between files enable a database to be more flexibly structured, as the containment relationships can be modified more freely and easily.

Another distinct feature of this example is that an instance can be added to the containment relationship file without having a blocked area called a brother recording area.

Embodiment 3

Figures 24, 25:
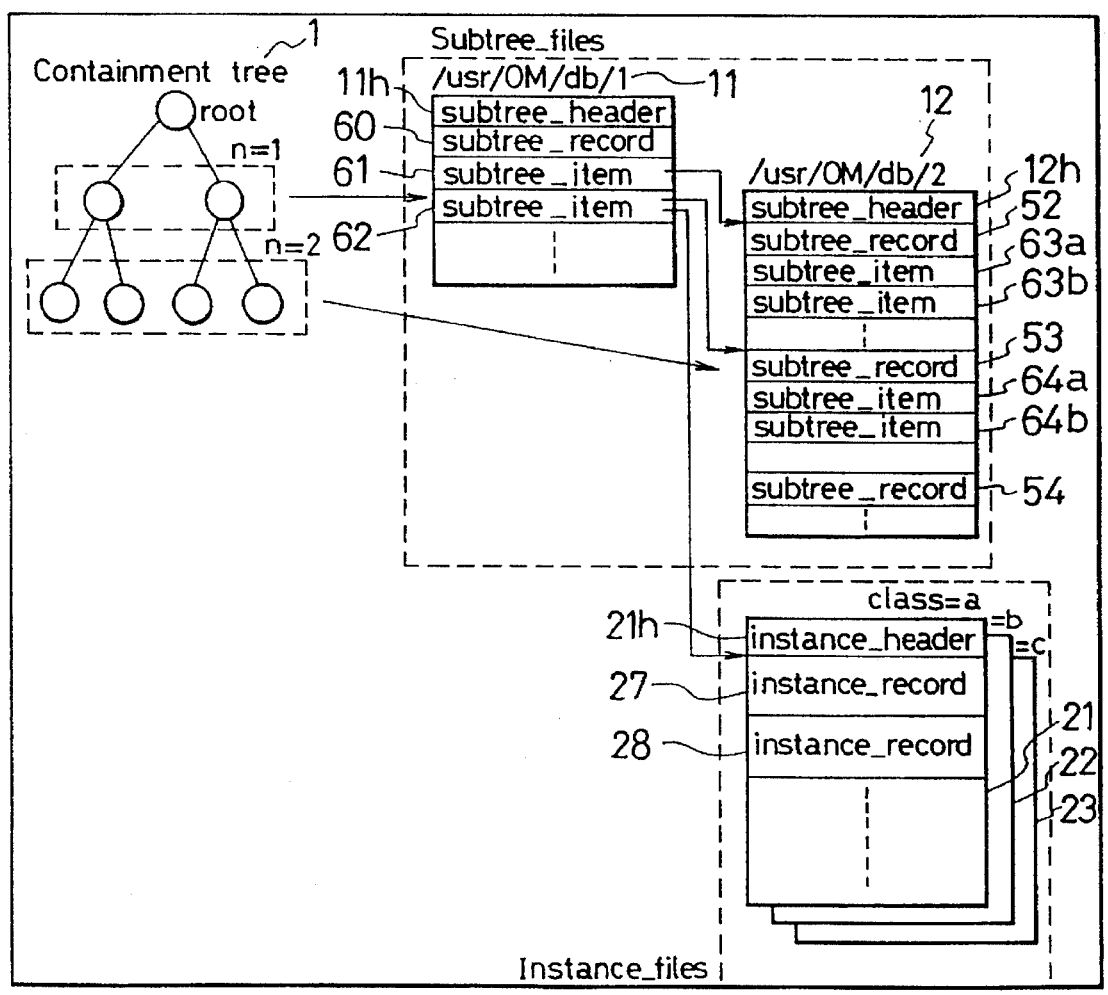
FIG. 24 gives another example of file names according to the present invention.
FIG. 25 gives another example of file structures according to the present invention.
Figure 26:
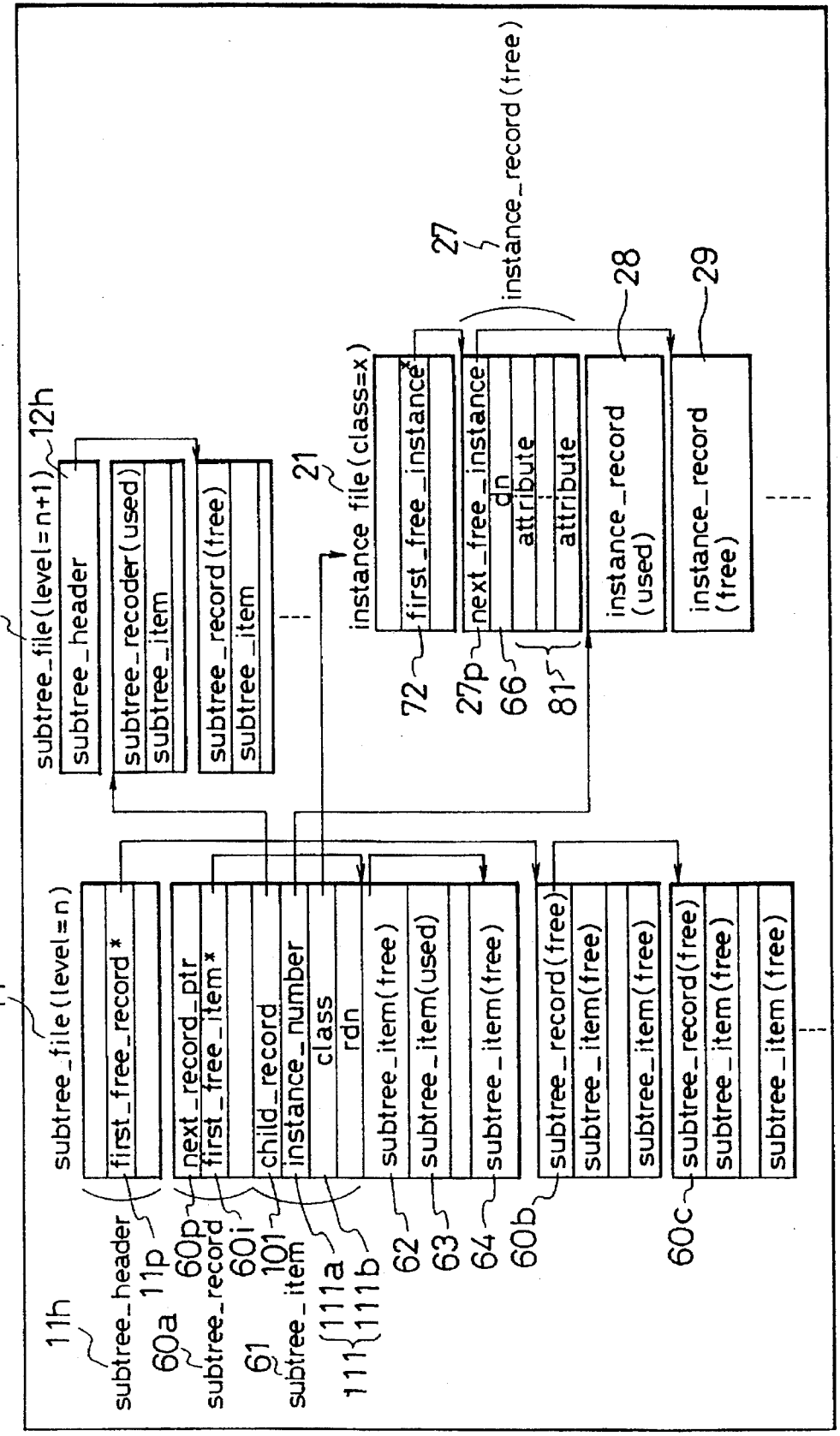
FIG. 26 is another example of file structures according to the present invention.
Figure 27:
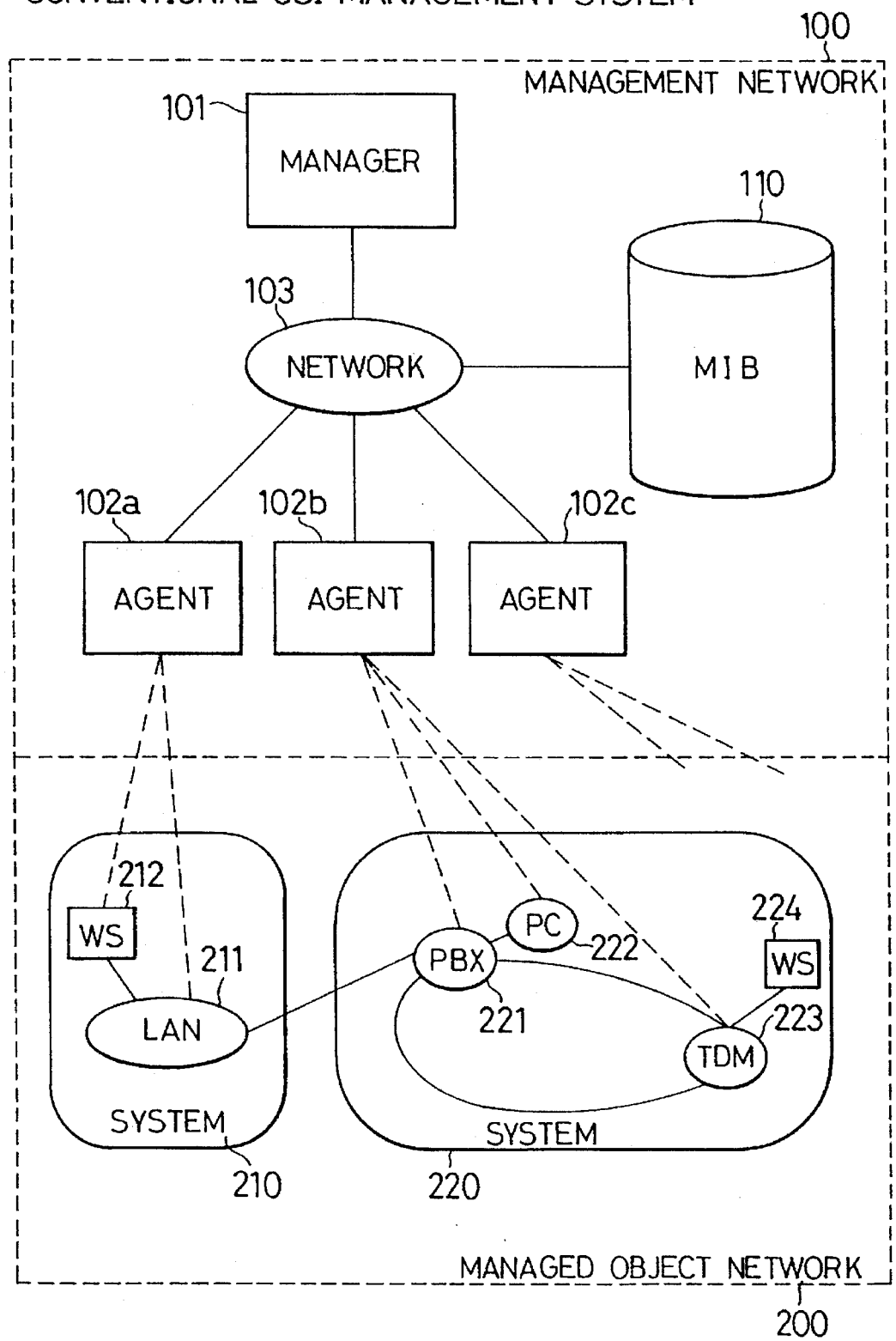
FIG. 27 is a conventional OSI management system.
Figure 28A:
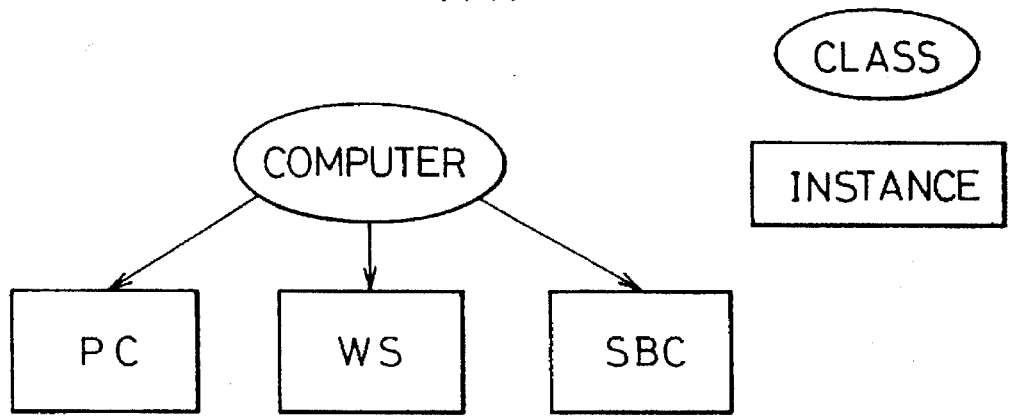
FIG. 28 shows three examples of conventional classes and instances.
Figure 28B:
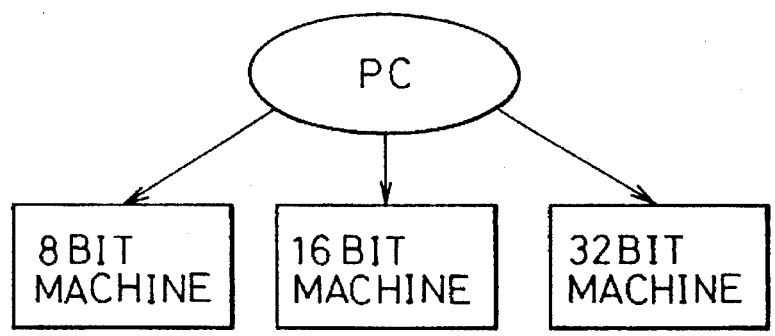
Figure 28C:
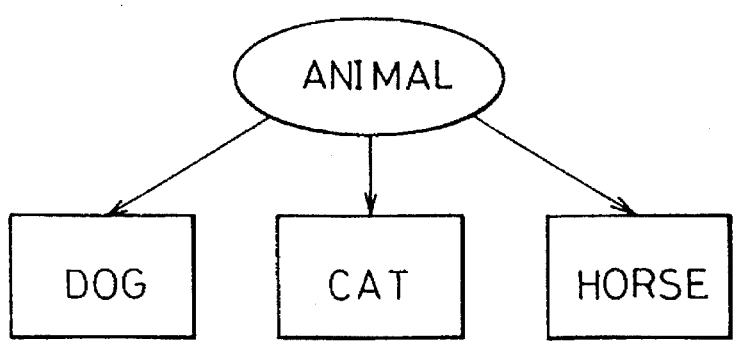
Figure 29:
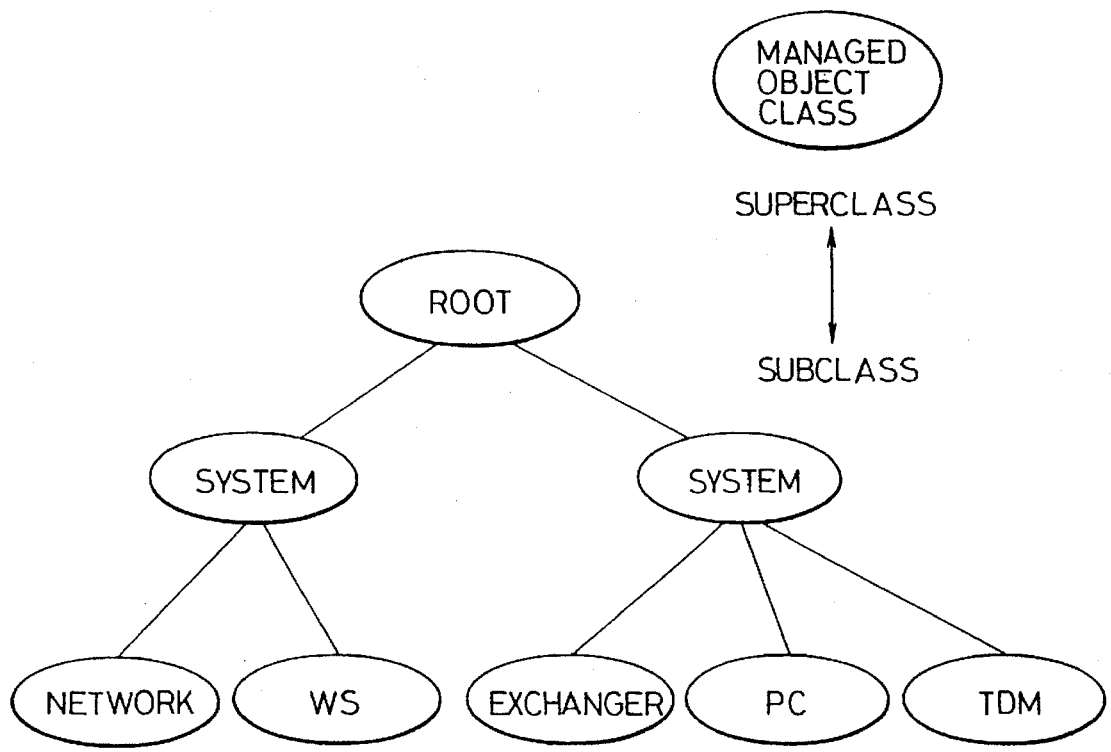
FIG. 29 shows a conventional inheritance tree.
Figures 30A, 30B:
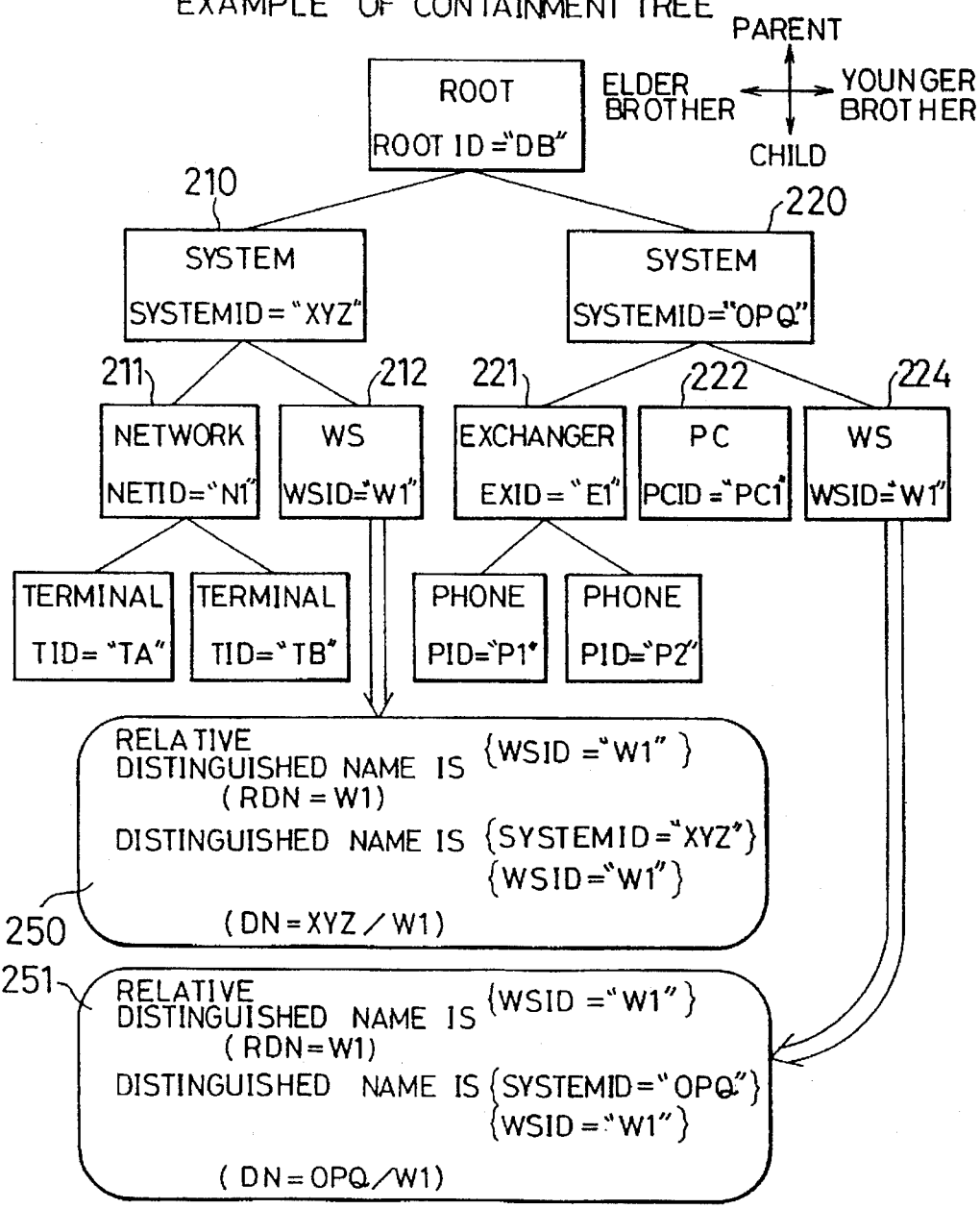
FIG. 30 shows a conventional containment tree.
Figure 32:
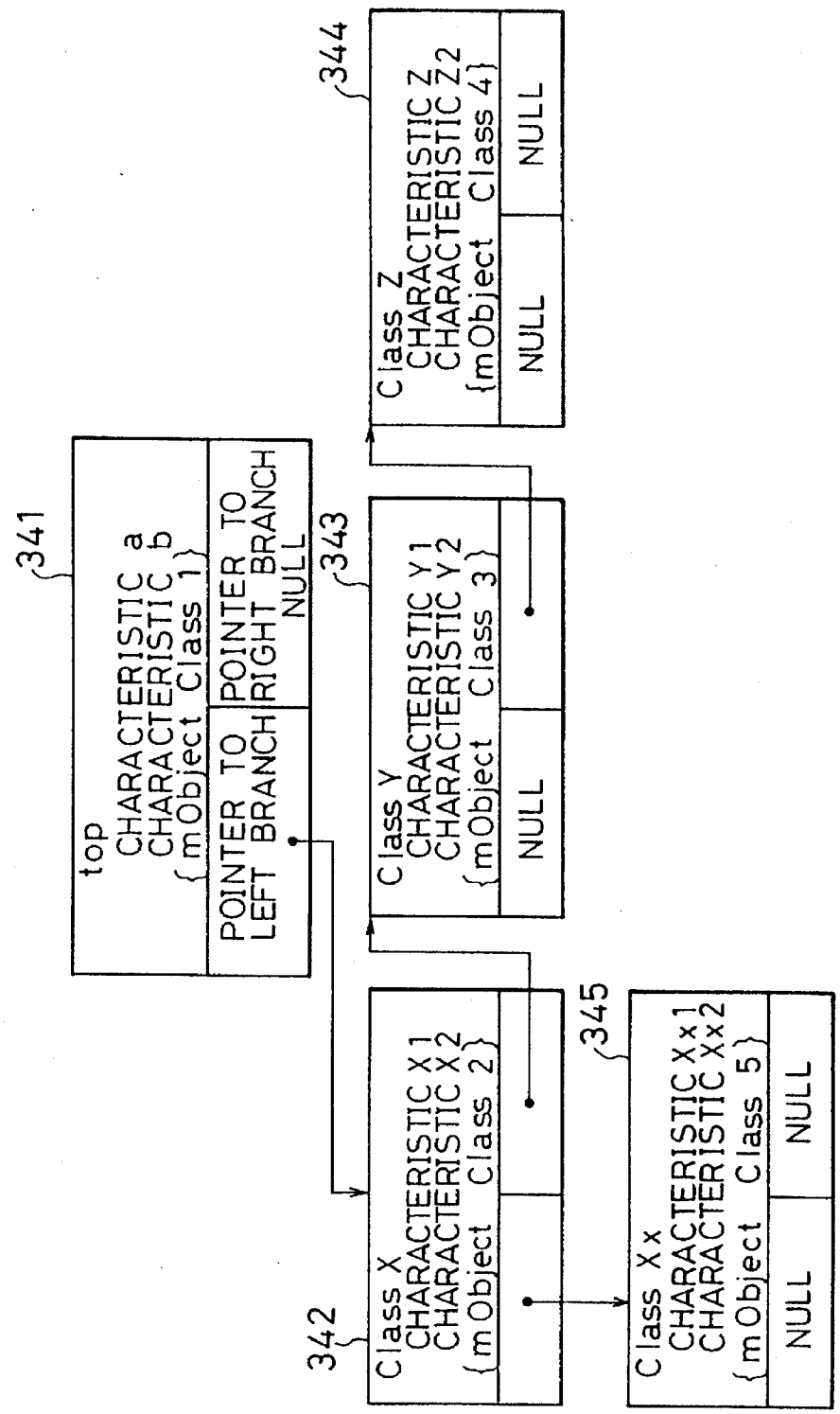
FIG. 32 shows a physical structure of a conventional inheritance tree.
Figure 33:
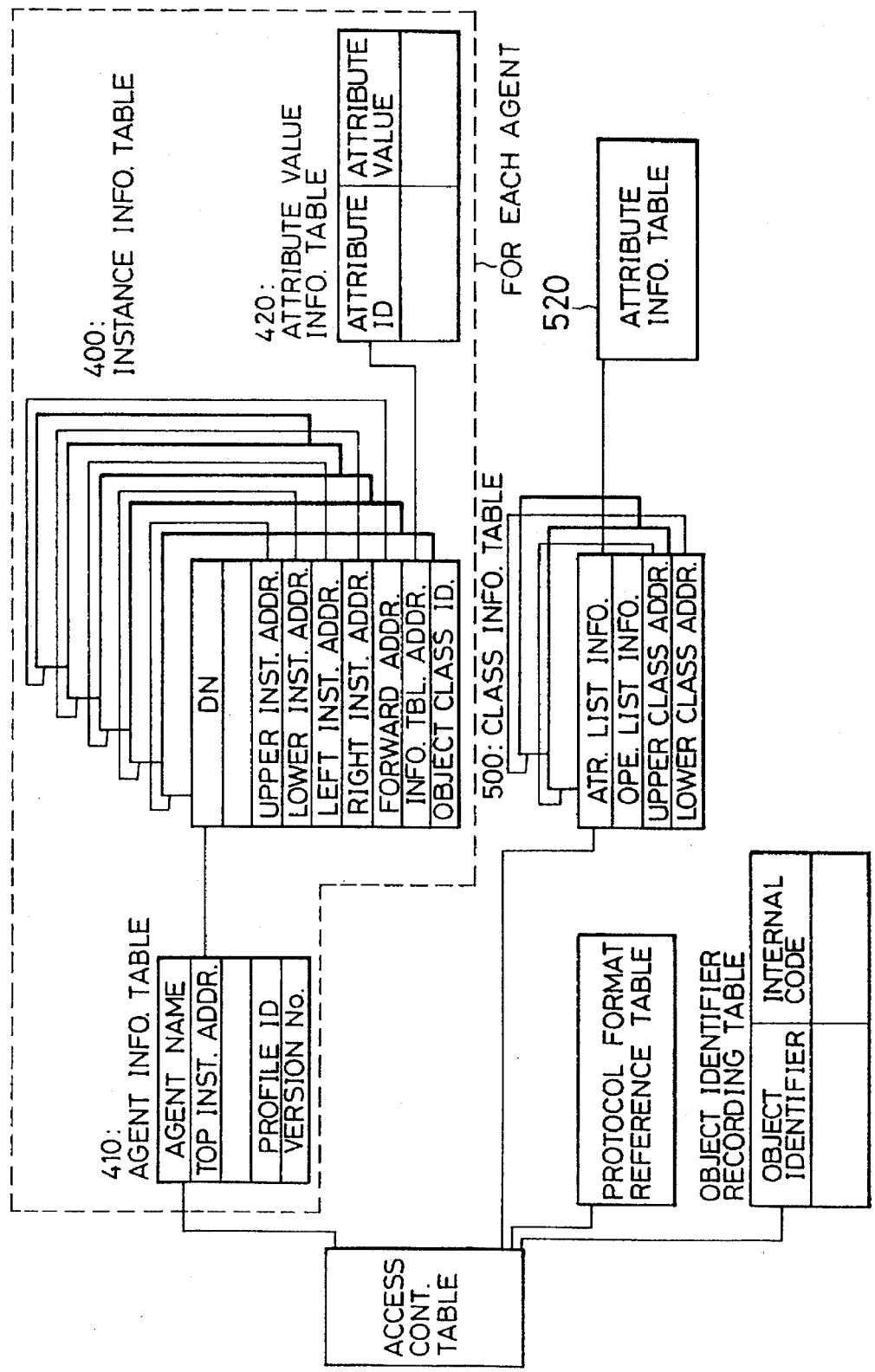
FIG. 33 outlines a data structure of a conventional MIB.

FIGS. 24 through 26 show concrete examples of a file structure and a data structure for a third embodiment. FIG. 24 shows file names according to this example. The containment relationship file is named subtree_file and the instance file instance_file. FIG. 25 shows the file structure. These files construct a database for storing containment relationships of instances and attribute values.

Containment relationships are stored in the subtree_files 11, 12, which are created for depth levels of the containment tree. On the other hand, attribute values are stored in the instance_file, which is created for each class. Applications can access this data via an application program interface (API).

The subtree_file 11 contains a subtree_header 11h which stores the control data of subtree_file 11.

The subtree_file 11 also contains subtree_items 61, 62 under the subtree_record 60 which store instances (brothers) having the same parent. The subtree_record 60 manages these subtree_items 61,62. If instances having the same parent cannot be stored in a single subtree_record 60, the remaining instances are stored in another subtree_record. Provided for each instance, for example, as shown in FIG. 26, the subtree_item 61 contains the RDN, a child-record 101 which is a pointer to a sub-level subtree-file, class 111b, and instance_number 111a which is a record number of the instance having the attribute value in an instance file.

The instance_file 21 contains the instance_header 21h which contains the control data of instance_file 21. The instance_file 21 also contains the instance_records 27, 28, each of which contains the attribute values of each instance.

FIG. 26 shows the data structure for this third embodiment. Free subtree_records 60b, 60c in the subtree files are sequentially linked with a pointer. The first_free_record 11p is a pointer to the first free subtree_record 60b in the subtree_file. If a used subtree_record 60a has become free, the subtree_record 60a gets pointed to by the first_free_record 11p, and a prior free subtree_record 60b which had been pointed to by the first_free_record 11p, until immediately before, gets pointed to by the free subtree_record 60a which has just been pointed to by the first_free_record 11p. The first_free_record 11p is not necessarily a free subtree_record closest to the top of a subtree file. Free subtree_records are not always linked sequentially from the top of the subtree file. The subtree_record pointed to by the first_free_record 11p will be used as the next new subtree_record.

A free subtree_record 60b has a pointer to the next free subtree_record 60c. If there is no other free subtree_record, the pointer of the last free subtree_record has a value of NULL.

The next_record_ptr 60p has a pointer and a flag which indicates whether the record is in use or free.

A record in use has a value of NULL as its pointer. The pointer, however, does have a meaning because, if instances having the same parent cannot be put into a single subtree_record, the remaining instances must be stored in another subtree_record. When instances having the same parent are stored in two or more subtree_records, the parent has the pointer for the subtree_record that was generated first, while the rest of the subtree_records are sequentially linked with a next_record_ptr 60p, in the order of their generation. If some of the instances stored in separate subtree_records are deleted, the remaining instances will not be gathered into a single subtree_record.

The free subtree items 62, 64 in a subtree_record 60a are managed in the same way as the free subtree_records 60b, 60c in a subtree_file 11 are. That is, free subtree_items 62, 64 are linked one by one with pointers. The first_free_item 60i has a pointer for the first free subtree_item 62 in the subtree_record 60a.

Like a next_record_ptr 60p, a child_record 101 has a flag indicating if a subtree_item is in use or free. The child_record also has a pointer. When the subtree_item is free, the pointer points to the next free subtree_item, or the pointer has NULL if there is no other free subtree_item. When the subtree_item is in use, the child_record has either NULL as its pointer or a pointer to the subtree_record in a sub-level subtree_file (a pointer to a child instance).

An instance_number 111a has the record number of an instance that stores the attribute values in the instance_file indicated by the class.

A class 111b is the managed object class to which the instances belong.

An rdn is the RDN of the instance.

A free instance_record 27 or 29 in the instance_file 21 is managed in the same way as the free subtree_record in the subtree_file 11. That is, free instance_records 27, 29 are linked one by one with pointers. The first_free_instance 72 has a pointer to the first free instance_record 27 in the instance_file 21.

Like the next_record_ptr 60p, the next_free_instance 27p has a flag that indicates an instance record 27 is in use or free. The next_free_instance 27p also has a pointer. When the instance_record is free, the pointer points to the next free instance_record 29, or it has NULL if there isn't any other free instance_record.

When the instance_record is in use, the next_free_instance 27p has NULL as its pointer.

A dn is the DN of the instance.

Attributes 81 are equivalent in number to the maximum number of attributes the class for the instance file can possibly have. Each attribute has its value and object identifier.

File configuration and data structure have been explained with concrete examples.

Embodiment 4

In the first example, operating time is given as one example of attribute.

Given below are other examples of attributes.

One way of making the best of attributes is to use them for the security management of a network. If a password is stored for each managed object as its attribute, a password entered at a terminal is referenced, thereby checking user accesses or preventing invalid accesses to the network resources.

Embodiment 5

If the number of data transmissions and the amount of data transmissions are stored as the attributes besides the operating time, it becomes possible to measure how much network resources have been used. This will help avoid network overload and realize an optimum network operation.

Embodiment 6

Besides these examples heretofore mentioned, accounting management for the network use can also be conducted if the amount of money is included as one of the attributes.

What is claimed is:

1. A management information base, in an OSI management system, comprising:

(a) a plurality of containment relationship files for storing a containment relationship between managed objects of the OSI management system, the containment relationship indicating how the managed objects of the OSI management system are related, wherein the containment relationship is a containment tree having a plurality of depth levels;

(b) a plurality of instance files for storing management information about the managed objects; and (c) database access means, coupled to the containment relationship files and the instance files, for collecting the management information from the managed objects of the OSI managements system, for storing the management information in the instance files, and for accessing the management information in the instance files according to the containment relationship in the containment relationship files;

wherein the database access means includes managed object class maintenance means responsive to creation of a new managed object class, for creating a new instance file corresponding to the new managed object class, and wherein the database access means includes instance maintenance means, responsive to addition of a new managed object at a depth level in the containment tree which is assigned a managed object class, for storing the new managed object in a brother recording area of a containment relationship file corresponding to the depth level of the new managed object, for storing management information of the new managed object in an instance file corresponding to the managed object class, and for creating a pointer to point from the brother recording area in the containment relationship file to the management information in the instance file.

2. The management information base of claim 1, wherein the management information base is coupled to an OSI management system, and wherein the database access means includes means for collecting the management information of the managed objects through the OSI management system.

3. The management information base of claim 1, wherein the plurality of depth levels of the containment tree includes a top level and a bottom level and wherein a relationship file is created at each depth level of the containment tree.

4. The management information base of claim 3, wherein the database access means further includes file creator means for creating the containment relationship files which have file names corresponding to the depth level of the containment tree.

5. The management information base of claim 3, wherein each of the containment relationship files include blocked areas for storing a plurality of brother managed objects based on the level of the containment tree.

6. The management information base of claim 5, wherein each of the blocked areas includes a pointer for pointing to another blocked area when a brother is stored in another blocked area.

7. The management information base of claim 6, wherein a managed object class is assigned to each of the managed objects and an instance file is created corresponding to each of the managed object classes so that the management information of the managed object class is stored in the instance file assigned to the managed object class.

8. The management information base of claim 7, wherein the containment relationship files include a pointer for pointing to the managed object, stored in the containment relationship file, which corresponds to a lower level of the containment tree such that the pointer represents a parent-child relationship.

9. The management information base of claim 7, wherein the instance files include an update time area within the management information area, wherein the database access means includes update means for updating and storing an update time in the update time area, and a display processor for accessing and displaying the management information according to the update time.

10. The management information base of claim 7, wherein each managed object class has object identifiers for identifying each of the classes, and wherein the database access means further includes file creator means for creating the instance files which have file names derived from the corresponding managed object class.

11. The management information base of claim 10, wherein the file creator means includes means for creating a subdirectory which has a directory name derived from the managed object class and creates the corresponding instance file in the subdirectory.

12. The management information base of claim 7, wherein the instance files further include an area for storing a maximum size of the management information.

13. The management information base of claim 12, wherein the database access means further includes management information size maintenance means, responsive to a change in size of the management information, for changing the size value of the management information stored in the size area to a new size, and for restructuring the instance file to accommodate the new size.

14. The management information base of claim 13, wherein the managed objects have a number of attributes, each of a different size, and wherein the instance file includes an area for storing the management information which is large enough to store the maximum number of attributes and the maximum size of attributes.

15. The management information base of claim 14, wherein the database access means further includes containment tree maintenance means, responsive to a change of the containment relationship indicating that a configuration of the OSI management network has changed, for rearranging pointers representing the parent-child relationship and the brother relationship so that the containment relationship can be changed to reflect changes in the OSI management system during on-line operation.

16. The management information base of claim 15, wherein the OSI management system includes a management network and a managed object network, and wherein the containment tree maintenance means further including means for recognizing that a configuration of the managed object network has changed, and means for updating the containment relationship files in response to the change in the managed object network without interrupting operation of the managed object network.

17. The management information base of claim 14, wherein the management information size maintenance unit restructures the instance file to accommodate addition of a new attribute to the management information.

18. The management information base of claim 17, wherein the database access means further includes garbage collector means for cleaning up previously used areas in either one of the containment relationship files and the instance files.

19. The management information base of claim 17, wherein the management information size maintenance means includes means for restructuring the instance file without interrupting operation of the OSI management system.

20. A method for managing a management information base for an OSI management system, wherein the management information base is a set of managed objects of the OSI management system, in a containment relationship indicated by a containment tree and each of the managed objects belongs to a managed object class and wherein the management information base is coupled to the OSI management system and the OSI management system includes a management network and a managed object network, the method comprising the steps of:

(a) creating a containment relationship file at each depth level of the containment tree, for storing the containment relationship;

(b) providing a parent-child relationship between containment relationship files and a brother-brother relationship within containment relationship files;

(c) creating at least one instance file for each managed object class for storing management information of managed objects;

(d) collecting management information from the managed objects of the OSI management system over the management network and the managed object network;

(e) storing the management information collected from the managed objects in the instance files and linking the managed objects with the containment relationship files; and (f) upon addition of a new managed object at a depth level in the containment tree, storing the new managed object in a brother recording area of a containment relationship file corresponding to the depth level of the new managed object, storing management information of the new managed object in an instance file corresponding to the managed object class, and creating a pointer to point from the brother recording area in the containment relationship file to management information in the instance file.

21. The management method of claim 20, further comprising the step of maintaining the containment relationship files to accommodate a change of the containment relationship.

22. The management method of claim 20, further comprising the step of collecting unused area in the containment relationship files and instance files.

23. A management information base in an OSI management system having a management network and a managed object network having managed objects, the management information base comprising:

a plurality of containment relationship files that store a containment relationship between the managed objects of the OSI management system, the containment relationship indicating how objects of the OSI management system are related, wherein the containment relationship is a containment tree;

a plurality of instance files that store management information about the managed objects; and a database access unit, coupled to the management network and coupled to the containment relationship files and the instance files, that includes a containment tree maintenance unit that accesses the managed object network through the management network and recognizes that a configuration of the managed object network has changed and updates the containment relationship files in response to the change without disrupting operation of the managed object network, the database access unit further including an instance maintenance unit, responsive to addition of a new managed object at a depth level in the containment tree which is assigned a managed object class, for storing the new managed object in a brother recording area of a containment relationship file corresponding to the depth level of the new managed object, for storing management information of the new managed object in an instance file corresponding to the managed object class, and for creating a pointer to point from the brother recording area in the containment relationship file to the management information in the instance file.

24. The management information base of claim 23, wherein the database access unit further includes a management information size maintenance unit that restructures one of the plurality of instance files to accommodate addition of a new attribute to the management information system without interrupting operation of the management information system.

25. The management information base of claim 23, wherein the database access unit includes a file creator unit that initially creates the files of the database and collects management information from the managed objects for storage in the instance files.

* * * * *